(12) United States Patent
Grob

(10) Patent No.: US 7,150,706 B2
(45) Date of Patent: Dec. 19, 2006

(54) MACHINING STATION

(76) Inventor: Burkhart Grob, Romerstrasse 68, Bad Wörishofen (DE) 86825

( * ) Notice: Subject to any disclaimer, the term of this patent is extended or adjusted under 35 U.S.C. 154(b) by 205 days.

(21) Appl. No.: 10/614,222

(22) Filed: Jul. 8, 2003

(65) Prior Publication Data

US 2004/0132595 A1    Jul. 8, 2004

(30) Foreign Application Priority Data

| Jul. 9, 2002 | (DE) | ................................ 102 31 043 |
| Jul. 18, 2002 | (DE) | ................................ 102 32 777 |
| Aug. 16, 2002 | (DE) | ................................ 102 38 386 |
| Nov. 19, 2002 | (DE) | ........................... 202 17 937 U |
| Dec. 5, 2002 | (DE) | ........................... 202 18 805 U |
| Mar. 21, 2003 | (DE) | ........................... 203 04 653 U |

(51) Int. Cl.
 *B23Q 3/157* (2006.01)
 *B23P 23/06* (2006.01)

(52) U.S. Cl. ........................... 483/54; 483/30; 29/563; 29/33 P; 409/172

(58) Field of Classification Search ................ 29/563, 29/33 P, 564; 483/54, 30; 409/172, 158; 408/68, 70; 198/346.1, 346.2
See application file for complete search history.

(56) References Cited

U.S. PATENT DOCUMENTS 3,559,256 A * 2/1971 Lemelson .................. 29/33 P
3,576,540 A * 4/1971 Fair et al. .................. 29/563
3,854,889 A * 12/1974 Lemelson .................. 29/33 P
5,688,084 A * 11/1997 Fritz et al. .................. 409/202
5,781,983 A * 7/1998 Gruner .................. 29/563
6,708,385 B1 * 3/2004 Lemelson .................. 29/563
6,826,821 B1 * 12/2004 Geiger et al. .................. 29/563

FOREIGN PATENT DOCUMENTS

| DE | 4422416 C1 | 1/1996 |
| DE | 19525419 A1 | 1/1997 |
| DE | 4435024 C2 | 4/1997 |
| DE | 29815125 U1 | 12/1998 |
| EP | 0614724 A2 | 9/1994 |
| EP | 0816012 A1 | 1/1998 |
| WO | WO02/00387 | 1/2002 |
| WO | WO 200200388 A1 * | 1/2002 |

* cited by examiner

*Primary Examiner*—Monica Carter
*Assistant Examiner*—Dana Ross
(74) *Attorney, Agent, or Firm*—Jacobson Holman PLLC

(57) ABSTRACT

A machining station, at least one machining unit, in particular a tool spindle, being provided for the machining of workpieces. The workpiece is approached to a discharge point and picked up there by a workpiece carriage. The workpiece carriage moves the workpiece for a machining to the machining unit or moves the workpiece during its machining through the machining unit.

71 Claims, 29 Drawing Sheets

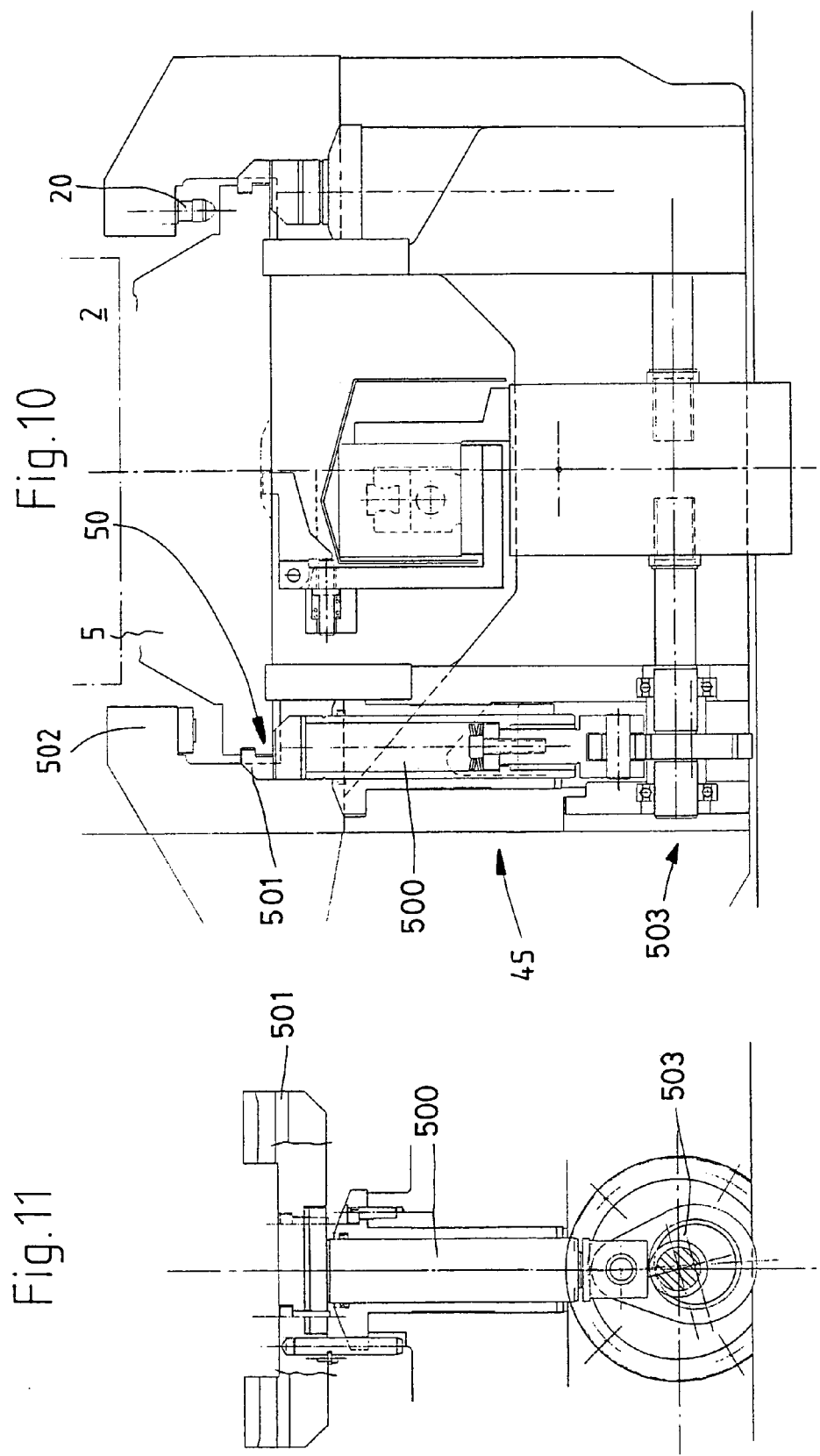

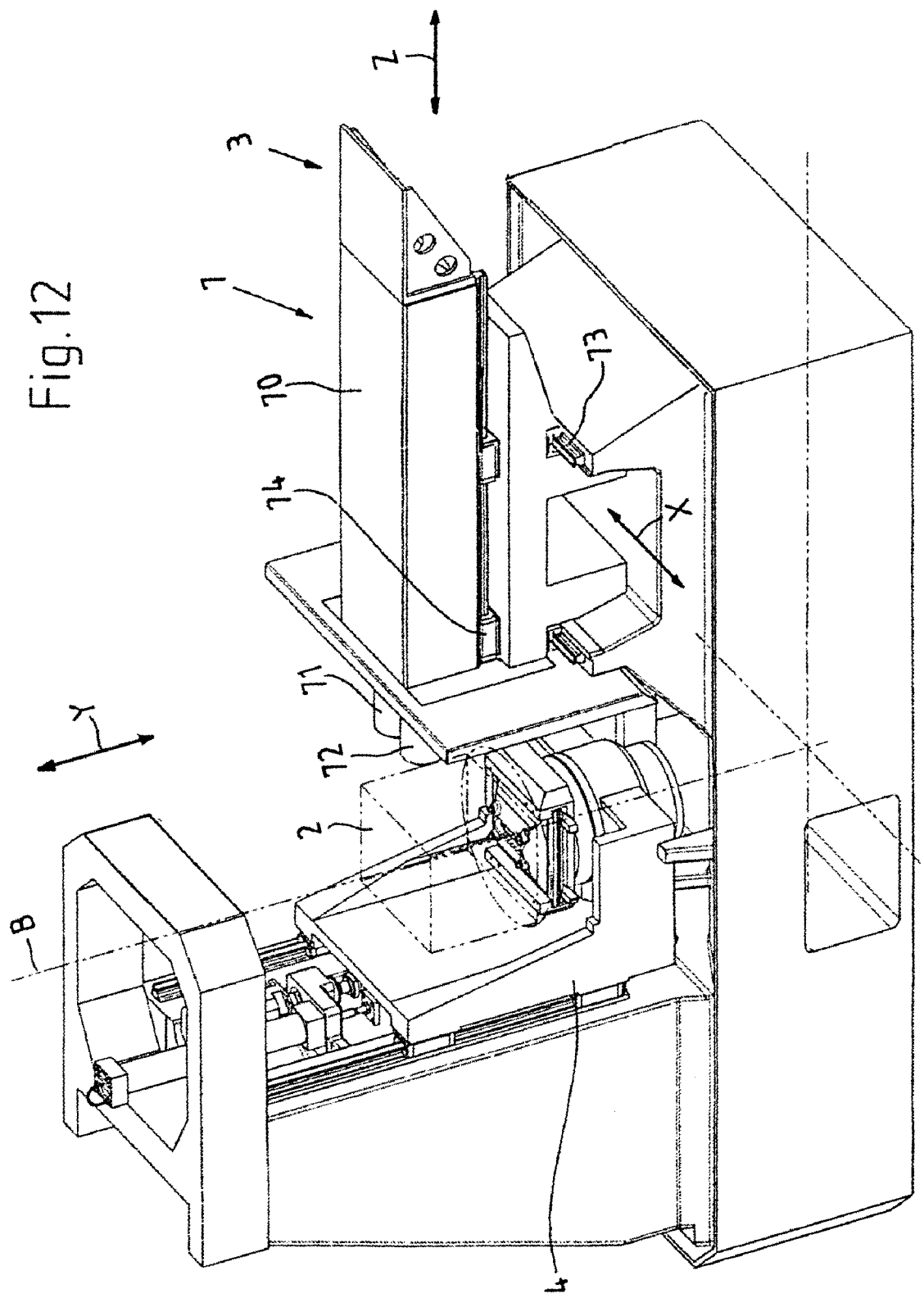

MACHINING STATION

Figure 1:
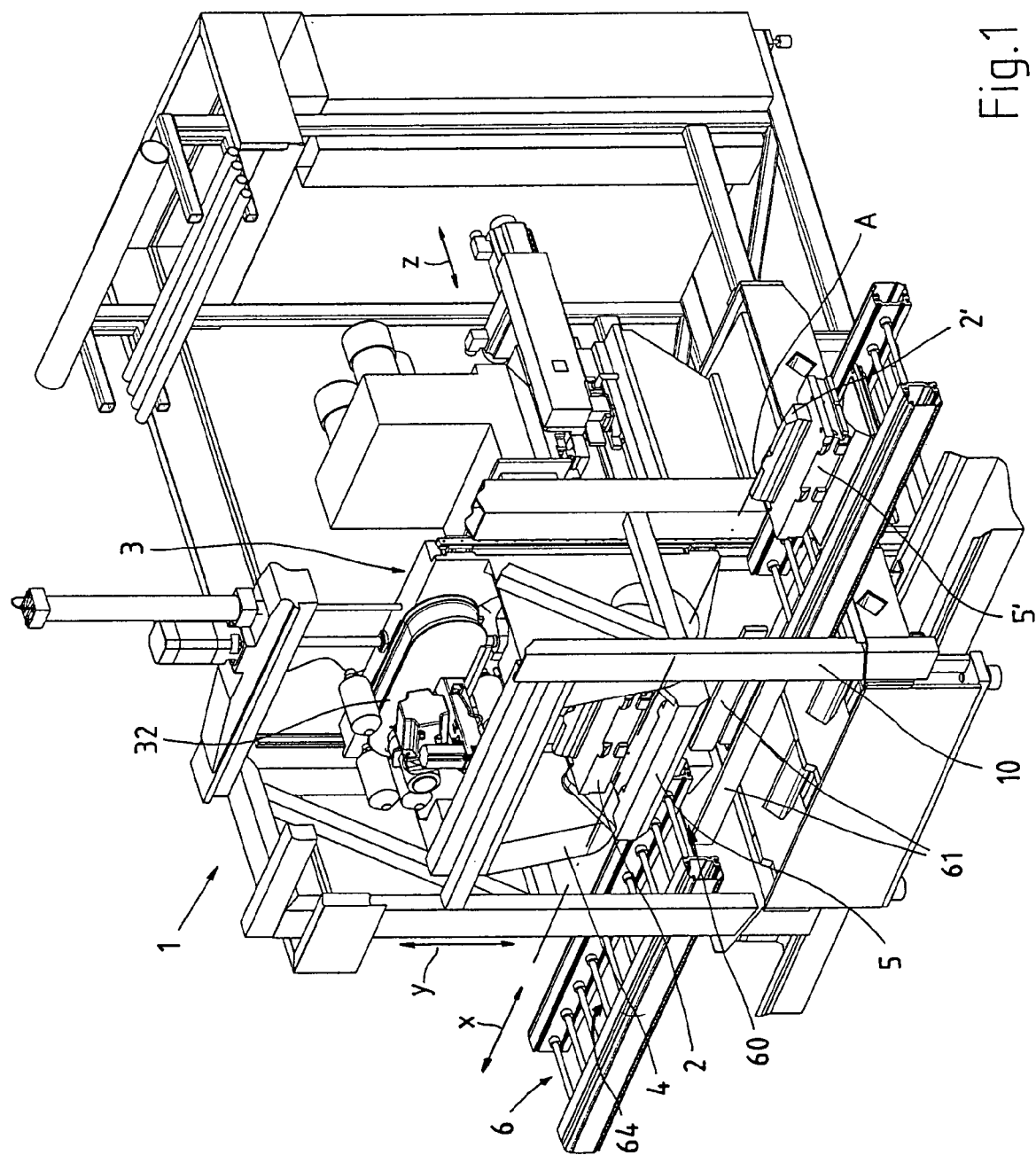

The invention refers to a machining station, for the machining of at least one workpiece at least one machining unit being provided and the workpiece being conveyed to a discharge point. At the discharge point the workpiece is taken up by at least one workpiece carriage.

BACKGROUND OF THE INVENTION

Machining stations as mentioned before are used, for example, in transfer lines. In transfer lines a plurality of machinings, which are often complex, are carried out on workpieces. For that a plurality of machining stations, in particular for metal cutting machining, are arranged one behind the other and connected to each other by a conveying line. A few machining steps are carried out by the machining station, however, the plurality of the machining stations, one arranged behind the other, allow a varied and also complex machining of the workpiece.

Of course, here a highly exact positioning of the workpiece with regard to the machining unit, respectively the tool head or the tool spindle, is essential.

The state of the art therefore knows so-called translators or a topside transfer which remove the workpiece from the conveying line and put it down on a machining point.

Thus, for example, the German patent specification 44 22 416 shows a machining center where the workpiece is clamped on a workpiece carrier. The workpiece carrier can be moved into a workpiece changing station where a workpiece change is carried out. This workpiece changing station is located away from the machining unit that means not in the direct range of the machining spindle. The workpiece carrier can be lowered here along a vertical axis (Y-axis) in order to take up the workpiece in the changing station. Furthermore the workpiece carrier can be moved horizontally (in Z-direction) in order to move the workpiece towards the tool spindle. Furthermore it is provided, according to this state of the art, that the workpiece can be rotated around a vertical axis (B-axis).

It is a disadvantage in this state of the art that the construction for the two linear axes and the one rotational axis of the workpiece is very large. The two linear axes in Y- and Z-direction are designed as compound rests and need, for a sufficiently high positioning accuracy, an appropriate effort, leading to heavy masses (and thus to large drives and high expenses). It has to be taken into consideration here that, for example, on the arrangement designed as a portal also the vertical rotational axis of the workpiece in the workpiece carrier has to be taken care of.

Besides the very high expenses, this arrangement is not suited, either, to reach a high efficiency because the workpiece carrier has to be removed from the machining room, that means from the range of the machining spindle, in order to put down a machined workpiece on a remote workpiece changing point and to pick up a new workpiece.

A similar suggestion also shows the utility model 298 15 125. In this device, too, the workpiece is offered on a workpiece discharge point to a workpiece holding device which can move along at least two axes X and Z which feeds it a plurality of machining stations arranged one behind the other.

BRIEF SUMMARY OF THE INVENTION

The present invention has the object to design known machining stations in a simpler way. By means of a simple design of the above-mentioned machining station more favourable production costs of the machining station could be achieved.

In order to solve this task the invention comes from a machining station as described in the beginning, and suggests that the workpiece carriage conveys the workpiece to the machining unit for a machining as well as moves it during the machining in the machining unit, the workpiece being movable by the workpiece carriage along only one linear axis.

The proposition according to the invention consciously abandons the use of an expensive topside transfer or a translator which allows a movement of the workpiece along several linear axes. The function of the topside transfer is combined with the movement of the workpiece carriage which positions the workpiece with regard to the machining unit.

In contrast to the solutions according to the state of the art the suggestion according to the invention allows less effort for the positioning of the workpiece with regard to the machining spindle. Basically it is possible that several rotational axes for the workpiece are also connected with the one linear axis of the workpiece carriage. However, because the constructive effort for the workpiece carriage is limited consciously now additional rotational axes can be integrated into the workpiece carriage and therefore guarantee a high comfort and flexibility of the machining station according to the invention.

Compared with the solutions according to the prior art, therefore, with less effort than the one in the solutions according to the prior art, the same machining possibilities (three linear axes and one rotational axis) are realised, respectively with about comparative effort an additional rotational axis is offered.

The design according to the invention also results here in the advantage that one of the three (orientated orthogonal, respectively rectangular, to each other) motion, respectively linear, axes (which is the same in this connection) is integrated for the machining into the movement of the workpiece carriage and thus also the effort for the formation of the motion axes of the machining unit is reduced. By means of a distribution of the different motion axes to the two elements which have to be positioned with regard to each other, namely the workpiece on the one hand and the machining unit on the other hand, the constructive effort is reduced additionally. This effect is parallel with the saving of the now unnecessary topside transfer.

However, the design according to the invention allows also to move the workpiece through the machining unit during the machining. The motion axis of the workpiece carriage is thus not only used for positioning, but also during machining.

In a preferred embodiment of the invention it is provided that the discharge point is located within the machining station, respectively in the working area. The advantage of this embodiment lies in the fact that the workpiece which has to be machined is already approached closely to the machining unit. A variant according to the invention avoids long conveying ways of the workpiece which leads to a necessary standstill of the working station and thus reduces the metal cutting performance. The invention provides here, that the discharge point is located within the machining station, respectively the working area. In this respect it also counts as the working area when the conveying line which extends through the machining station for example through a door, a chip protection or the like, is covered during operation. Also when, in this respect, the working area is subdivided the discharge point is nevertheless very close to the machining unit, which is eventually relevant, namely that short ways are realised for the conveying of the workpiece.

As now the use of a topside transfer is abandoned the machining stations according to the invention are constructed accordingly more economically. Simultaneously also an acceleration of the machining is achieved because the necessary transport of the workpiece to the machining unit is reduced clearly according to the invention, compared with the solution of the state of the art.

The machining station according to the invention thus does not only provide the advantage in the production of the station, but also it offers corresponding advantages in the use because it can machine workpieces more efficient.

It is an advantage if the workpiece carriage moves essentially vertically. The vertical axis is usually called the Y-axis, the three space axes X, Y, Z being orthogonal to each other and allowing a positioning of the workpiece with regard to the tool spindle on each direction of the space. Here often as Y-axis is seen the direction of the rotational axis of the tool spindle. The X-axis describes, as far as applicable, the direction of the conveying line. The application of the invention is not limited to a vertical orientation of the motion line of the workpiece carriage. However, it has the advantage that, by means of the vertical movement, on the one hand, the workpiece can, in a clever way, be lifted from the conveying line, respectively the discharge point, and simultaneously be conveyed along a motion axis for the multi-axes movement to the machining unit. Exactly in the use of these two effects there lies an essential advantage of this variant according to the invention. As the vertical positioning is performed by the workpiece carriage the machining unit does not need a vertical movability or, generally, a movability parallel to the movement of the workpiece carriage.

It is convenient when the workpiece is clamped on a workpiece carrier. The use of a workpiece carrier, for example, a device carriage, a pallet, a slab and so on allows to convey and machine even different workpieces along an often fully automatic production without any problem. The workpiece carriers have an generally known indexing so that a highly exact positioning of the workpieces for their complex machining is possible.

According to the invention it is provided that the workpiece is clamped on the workpiece carrier either upright, suspended, lateral or inclined. In one case it is provided that the workpiece is clamped on the slab upright and is also conveyed in this way. As conveying line in such a case serves, for example, a roller conveyor (for example a friction roller conveyor). However, it is also possible that the workpiece is clamped on the workpiece carrier suspended and thus in particular a dry machining is possible because the chips can fall downward unimpeded during the metal cutting. Instead of a conveyor line formed by rollers here also, for example, a conveyor line can be provided which has lateral guide rails with wheels on which the pallet is supported and the workpiece projects downward between the two guide rails of the conveying line. Conveniently the workpiece is clamped here to the workpiece carrier in such a way that the machining can be carried out as optimised as possible. If, for example, inclined borings have to be carried out, it is convenient to clamp the workpiece accordingly inclined to the workpiece carrier, namely under the respectively desired angle. The spindle axis remains in such an embodiment in the horizontal position and does not need an additional swivel drive. The inclined or lateral clamping improves, if necessary, also the dropping off of the cooling lubricant which otherwise would remain on the workpiece.

The invention provides that the workpiece carriage grips and holds the workpiece, respectively the workpiece carrier carrying the workpiece, from above, from the side and/or from below. The different arrangements are given by the respective range of application. Sometimes it may be convenient to grasp the workpiece with regard to the conveying direction of the conveying line in the front or lateral in the back, however, it is also possible to grasp and to clamp the workpiece, for example for a machining of its lower surface, from above. Of course, it is also possible that the workpiece carriage grasps and holds the workpiece, respectively the workpiece carrier carrying the workpiece, in an inclined way. Here also the same advantages occur as in an inclined clamping of the workpiece on the workpiece carrier.

In a preferred embodiment of the invention a turning station is provided. Therefore it becomes, for example, possible that workpieces guided suspended in the machining station are conveyed between the machining stations upright or inclined. A special type of wheels, called "Rhoen"-wheels, is used, for example, to turn the workpieces clamped on the workpiece carrier. However, it is also possible to use turning stations which are designed differently. In connection with the invention also an arrangement is seen as turning station which turns the workpiece on the workpiece carrier, respectively clamps it differently. Here also a turning of the workpiece with regard to the workpiece carrier may be provided, optimising the respective machining.

In a preferred embodiment of the invention it is provided that the workpiece carriage is designed like a table and the workpiece is supported by the workpiece table of the workpiece carriage. Such a design is convenient, for example, for simple machining steps, simultaneously the guide of the table can be realised in a simple manner. Simultaneously a good accessibility of the workpiece for machining is given.

If it is planned that the workpiece should be machined on several sides one after the other, it is convenient if the workpiece, respectively the workpiece carrier, can rotate. In such a case it is favourable that the workpiece carriage is designed like a frame or like a rocker in order to reach in a simple way the design of a corresponding hinged bearing.

Therefore it becomes possible to realise a rotational axis which is, for example, parallel to the A-, B- or C-axis of the machine. If necessary, the hinged bearing can also rotate around an axis with horizontal orientation.

In a preferred embodiment of the invention it is provided that the workpiece carriage can rotate the workpiece around at least one rotational axis. This development according to the invention results in additional advantages. It is possible to offer the workpiece on several sides for machining. It is, in particular, an advantage when the workpiece on the workpiece carriage can be turned around 0° to 360° by means of a special turning device. Thus not only a machining of the surface area of the workpiece is possible, but also machinings inclined in the space, for example the inclined drilling of a discharge valve in a cylinder head or the like, can be carried out without any problems. It is convenient here that the workpiece carriage can be positioned again in Y-direction and thus allows a correspondingly highly exact positioning even in inclined drillings; a Y-movement of the machining unit is not necessary here, either.

In another preferred embodiment of the invention it is provided that the rotational axis is, on the one hand, rectangular to the spindle axis and, on the other hand, rectangular to the direction of movement of the workpiece carriage. Often in this design the rotational axis will be also parallel to the conveying direction of the workpiece on the conveying line. The so defined rotational axis is often described, according to the nomenclature in the mechanical engineering, as A-axis. The workpiece clamped along its longitudinal axis can be machined on its surface areas when rotated around the rotational axis, only a machining of the front surfaces is not possible in that way because the corresponding holding device of the workpiece carriage may interfere. But it is possible to provide an additional rotational axis, for example parallel to the vertical axis (this is described as B-axis), on the workpiece carriage. By means of such a development according to the invention really a machining from all sides of the workpiece becomes possible.

It is possible here that the B axis is either realised in the workpiece carrier, the workpiece carrier is thus divided in two parts and allows a twisting, or that the workpiece carriage can be rotated itself. A rotational axis which is arranged parallel to the spindle axis is seen as C-axis.

Besides the possibilities mentioned before of a rectangular or parallel arrangement of the rotational axis with regard to the vertical movement direction of the workpiece carriage it is, of course, also possible to orientate the rotational axis angular, for example in 45° to the C- or B-axis in order to allow in this way a turning, respectively rotating, of the workpiece. Conveniently the workpiece carrier is designed here suspended.

In another embodiment according to the invention it is provided that the workpiece carriage can rotate the workpiece around two or three axes each standing rectangular to each other. By means of a high number of rotational axes correspondingly complex machinings become possible. For example, it is provided to carry out a five-axes machining, that means, two rotational axes (axis A, B or C) are added to the three translator axes X, Y, Z. In theory also six-axes machinings are possible, then three rotational axis are, for example, arranged in the workpiece carriage.

The workpiece carriage is, according to the invention, designed either suspended or upright (table-like). In both variants according to the invention different concepts can be realised.

At first it is provided to combine in the workpiece carriage the Y-axis with the A-axis. Furthermore it is possible to combine the Y-axis with the B-axis, a simple interlacing providing, for example, a connection for the further conveying of the workpiece in a table-like (upright) design of this rotational axis. However, it is more convenient for the unimpeded drop down of chips that the arrangement of the B-axis is realised suspended. For a five-axes machining, for example, a combination of the translator Y-axis with the Band A-rotational axes or the C- and A-rotational axes is provided. The translator X-, respectively Z-, axis is deduced from the movement of the tool spindle.

With regard to the number and orientation of the different rotational axes the invention is not limited at all. It is possible that the invention uses one as well as several rotational axes simultaneously. The invention does not limit, either, the orientation of the workpiece with regard to the workpiece carrier or the workpiece carriages. It is possible to use an one-, two- or three-axis rotation, respectively turning, of the workpiece with workpieces which are clamped on upright, suspended or inclined. According to the invention all possible variants are possible.

In a preferred embodiment of the invention it is provided that the workpiece carriage is guided in a frame and that the workpiece carriage is guided over two slides on the vertically orientated stand parts. Alternatively to that it is naturally possible to provide a stand for the workpiece carriage. The design in a frame has the advantage that a machining from the back, that is through the frame, is possible. This variant according to the invention also allows that a two side machining, in particular from both sides with regard to the conveying line, can be carried out. On both sides of the conveying line one machining unit each is provided and the metal cutting performance, respectively the machining performance, increases considerably. Simultaneously the frame allows a high stability which is convenient in order to reach a highly accurate machining. For the drive of the two slides, for example, ball roller spindles or linear drives or the like can be used.

In a variant according to the invention it is provided that the stand for the guide of the workpiece carriage is arranged in the region of the discharge point on side opposite the machining unit. The place for the arrangement of a second machining unit may be used for the arrangement of the stand, however, therefore a very stable stand can be realised which is in particular convenient for correspondingly heavy workpieces, respectively correspondingly stable workpiece carriages and their guides. Conveniently, here the stand which carries the workpiece carriage is connected with the machine stand of the machining unit, resulting in a high stability. However, it is also possible that the two stands are mounted, separately from each other, on the conveying line and, if necessary, are only cased together.

Alternatively it is provided that the frame which carries the workpiece carriage extends, respectively is supported, in the region of the discharge point on both sides of the discharge point. In this variant according to the invention the frame is eventually provided above the discharge point, leaving the workpiece accessible from two sides. This is particular advantageous for a simultaneous machining of the workpiece from several sides.

Conveniently it is provided that the vertically orientated stands, respectively frame parts, have guide rails on which at least one, preferably two, guide shows of the workpiece carriage move. A set of two guide rails for each side effects a higher torsion solidity and thus leads to a higher precision in the machining.

In a variant according to the invention it is provided that the workpiece carriage also moves horizontal, preferably rectangular, to the spindle axis. The motion axes necessary for the machining of the workpiece are her distributed between the machining unit (for example tool spindle) on the one hand, and movement of the workpiece on the other hand. It is possible here without any problems to design the workpiece carriage movably, for example, by means of a corresponding compound rest guide also along a second axis, conveniently these two movements being orientated rectangular each to the spindle axis.

In another variant according to the invention it is suggested that the workpiece carriage carries a tool magazine for the machining unit and the workpiece carriage can be positioned for a change of tools on the machining unit accordingly. By means of this development according to the invention an additional advantage becomes clear. The tool change is carried out, as a rule, also from the same position where, otherwise, the workpiece is offered for machining. This is, however, just the region which is passed by the workpiece carriage. During a tool change a positioning of the workpiece is not possible anyway, that means the workpiece carriage cannot be used anyway. However, if this workpiece carriage is used conveniently for carrying the tool magazine, synergies are released. Exactly during the time when no machining of a workpiece is possible anyway, nevertheless the workpiece carriage is used for a tool change, the workpiece carriage then being simply positioned in such a way that the tool change can be carried out as usual. The workpiece carriage carries here all necessary elements in order to carry out the tool change.

In a variant according to the invention it is provided that, independently from the movement of the workpiece carriage, also the tool magazine can be moved and positioned. For example, the magazine is designed as a component separate from the spindle, respectively the workpiece carriage, and has its own Y-axis (or, generally, a drive parallel to the movement of the workpiece carriage).

In this case the magazine is not located above the workpiece carriage (for example a circular table), but (in a top view) between the range of movement of the workpiece carriage and the spindle position at the very back (in the direction of the Z-axis). By means of that it is achieved that a tool change is carried out independently from the position of the Y-axis of the workpiece carriage, respectively the turning of the workpiece carriage, respectively the workpiece on it.

It is an advantage when a clamping device is provided in order to connect the workpiece, respectively the workpiece carrier which carries the workpiece, with the workpiece carriage. The clamping device may, conveniently, be arranged either on the workpiece carriage or also on the workpiece carrier or even on the workpiece itself. Conveniently the clamping device is arranged on the workpiece carriage, as the total number of workpiece carriages in corresponding installations is smaller than the number of workpiece carriers which have to be conveyed in it. However, basically all different variants are possible.

It is suggested to use the relative movement of the workpiece carriage for gripping, respectively releasing, the workpiece, respectively the workpiece carriers, from the workpiece carriage. For picking up, gripping, respectively releasing or solving the workpiece, respectively the workpiece carriers, a concept as simple as possible is chosen which is thus not susceptible for disturbances. Such a concept may be realised, for example, with connecting links or starting boarders and so on, which allow in, a simple manner, an appropriate mechanic control. Naturally, it is also possible to provide correspondingly more complex systems, for example with electric, magnetic or optical monitoring and control elements.

In another preferred embodiment of the invention it is provided that, during the workpiece carriage has picked up a first workpiece, at least one other workpiece is conveyed through the machining station. This results in an important advantage for this variant of the invention. In order to machine further workpieces the workpiece carriage is moved upwards so far, that other workpieces can move through the machining station to the next one, naturally, the lifting being chosen adequately large. This results in an enormous advantage. Here successfully stations are connected, that is interlaced, to each serial as well as parallel. In a serial arrangement here a different machining is assigned to each station in the direction of flow, a parallel machining, on the other hand, being realised in such a way that several stations (or machines) are equipped with the same machining tasks. The flexibility of such a machining installation equipped according to the invention, as it will be described later on, increases enormously. Both strategies can be carried out one after the other. For one type of workpieces the workpieces are machined one after the other in each station arranged along the belt, with the other type the workpieces are only machined in certain stations and pass others. When a station is defect this defect machine is simply passed, the machining is then taken over by another station.

It is convenient here that a chip protection is provided which avoids that chips fall upon the workpieces conveyed through the machining station. Often it is not desired that the workpieces passing below the workpiece carriage are soiled accordingly by chips falling down. Here several variants are possible how to realise a chip protection. According to the invention it is, for example, proposed that the chip protection is designed as a flap or slab moving together with the workpiece carriage and thus automatically forms a "roof" when a workpiece following later overtakes the leading workpiece which is in the workpiece carriage.

In another variant according to the invention it is provided that for a chip protection a door is arranged, for example is swung in or pushed in, below the workpiece carriage. As a protection against chips it is provided to push in a door between the machining zone (which is located upstairs) and the transport channel located downstairs. This door is here part of the machine casing and opens automatically with the movement of the workpiece carriage.

There is furthermore the possibility at any time to let the workpieces pass through the machining station only when there is a machining break, for example during a tool change break. A corresponding signal has to be given here by the tool station to the conveying unit.

In another preferred embodiment of the invention it is provided that at the hinged bearing a counter weight is arranged. This counter weight serves for balancing the weight, respectively the moment, of the carrier, respectively the moment of the workpiece carrier (inclusively the weight of the workpiece), picked up by the carrier. The counter weight serves for reducing the turning moment, respectively the weight, so far that the necessary drives do not have to work against these weights, respectively turning moments.

In a preferred embodiment of the invention it is provided that the counter weight is formed by a working cylinder which acts on a catch of the carrier. The catch is here not positioned on the rotational axis. The length of the catch and the piston area of the working cylinder mow are two variables which can be adjusted in such a way that they compensate the occurring moment. The possibility of the free turning of the carrier is left intact, the counter weight can be used in any position of the carrier.

The invention also refers to a machining installation, in particular a transfer line, which comprises at least one or more of the machining stations mentioned before, all machining stations being provided with a conveying line for feeding and removing the workpiece. The advantages described above of the machining station become clear in particular in a plurality of machining stations arranged one behind the other in a machining installation, in particular in a transfer line. In particular the shortened cycles for the machining, which result from a saving of the topside transfer, sum up conveniently in a plurality of machinings along a transfer line. The economic advantage of such a machining installation which also carries out complex operations increases considerably. It is, of course, also possible here, according to the invention, to equip the machining installation with machining stations, as also described in the invention, and naturally to mix it with machining stations according to the prior art. The effect according to the invention then is not so clear, however, it exists as well.

Furthermore it is an advantage that two or more machining stations are provided one behind the other and fed workpieces are guided through a first machining station to a free machining station. The design according to the invention achieves that the flexibility of a corresponding machining installation according to the invention is increased enormously. The reason why a workpiece here cannot be machined on in the first machining station is not important. The first station may be occupied, however, it may also be unsuitable for the machining or not functioning because of a necessary repair. If necessary, a consequently following workpiece overtakes a workpiece which is just being machined on where it is an advantage if each workpiece, respectively each workpiece carrier, carries an identification element which can be also written on, if necessary. The identification element is, for example, a read-write chip which, on the one hand, identifies the workpiece, but, on the other hand, also documents the progress of the machining. Alternatively it is possible to get the chance by means of the identification element of the machining station to inquire the respective status of machining of the workpiece in the central control where the respective machining steps are logged.

In another preferred embodiment of the invention a method for the positioning of a workpiece on a machining unit is suggested, the workpiece being conveyed on a conveying line to the discharge point, being picked up there by a workpiece carriage, in particular being lifted, and the workpiece carriage conveying the workpiece to the machining unit and/or the workpiece carriage moving the workpiece during the machining through the machining unit and the workpiece being put down again by the workpiece carriage after finishing the machining in the discharge point and, after that, the workpiece being removed on the conveying line, the workpiece being moved along only one linear axis by means of the workpiece carriage.

If the known process is compared to the state of the art, the method suggested according to the invention has considerable time advantages.

It is an advantage when the discharge point is located in the working area, respectively in the machining station. Conveniently the conveying line ends in the working area or close by.

In a preferred embodiment of the invention it is provided that the conveying means feeds workpieces, respectively workpiece carriers, waiting in front of the machining station on the conveying line into the machining station. Therefore it is provided that the machining station has conveying means for the movement of the workpiece, respectively the workpiece carrier, on the conveying line, at least in the region of the machining station. The conveying means may be separated here from the driving means of the conveying line or they may be identical with them. It is, for example, possible that as the conveying means a carriage with driver is provided which seizes the workpiece carriers waiting in front of the machining station and feeds them into the machining station to the discharge point. Alternatively it is possible that the conveying means takes care that the finished workpieces are removed from the machining station. Besides the use of a separate carriage it is possible, for example, to use frictional rollers, which can be controlled, of the conveying line as conveying means. The conveying line serves for interlacing the individual machining stations arranged one behind the other in the direction of flow, being an advantage that they reach as close as possible to the machining station, respectively into it in order to be able to save, if possible, additional drives within the machining station.

In another embodiment according to the invention it is provided that the machining stations are arranged one behind the other and the removal line of the first machining station is the feeding line of the second machining station. By means of that in a simple way an effective system of interlacing between the individual machining stations is realised. This principle can, for example, be used when workpieces are conveyed through a first machining station to another, free machining station.

Alternatively the invention also proposes that several machining stations are arranged between a feeding line and a removal line common for the machining station. It is, for example, provided that the feeding line is arranged parallel at a distance to a removal line. Between these two belts or lines any number of machining stations which can substitute each other are arranged which connected parallel to the material flow. The control determines which one of the stations working parallel is just being occupied, respectively free, and correspondingly controls the flow of the workpieces which have to machined. These many stations running parallel are supplied here by a common large buffer store with workpieces. The passage-through mentioned above is not decisive here. It has to be taken into consideration here that this concept can also be realised in machining stations which are not necessarily equipped with a workpiece carriage moving vertically. If necessary, the invention applies for individual protection of this idea independently.

Besides the possibility to use in this concept several parallel machining stations which are essentially identical or similar it is also possible to add stations in this concept with different machining steps. Therefore the system also can be used in many ways.

Furthermore it is convenient that there is a connecting line from the removal line to the feeding line, so that workpieces already machined on can be approached again on the feeding line for machining. A further machining may be carried out, for example, by the same machining station (if necessary with other tools, in the manner of a machining center) or by another machining station.

It is an advantage if the workpiece carriage is lifted for the removal of the workpiece. In particular it is provided to design the workpiece carriage cheek-like on the sides in order to form a bearing for the rotational axle. It is convenient here that the workpiece carriage has at least one, preferably two, lateral cheeks. Already by means of one lateral cheek basically a turning of the workpiece is possible. The arrangement becomes more stable when the workpiece is arranged between two lateral cheeks, if necessary, on a workpiece carriage or on two workpiece carriages. The result of that is that the workpiece is arranged between the lateral cheeks of the workpiece carriage and therefore can obstruct the removal of the workpiece. This is securely avoided by lifting the workpiece carriage for the removal of the workpiece. However, this may be abandoned if, for example, the workpiece carrier is designed in such a way that the workpiece carriage grips it on its upper edge and a moving backwards is not necessary.

The same goes as well for the feeding of the workpiece. It is also an advantage here that the workpiece carriage approaches the discharge point only when the workpiece has been fed.

In a preferred embodiment of the invention it is provided that the machining station has two towers for the movement of the workpiece, each tower carrying a movable workpiece carriage and the workpiece carriages carrying at least one workpiece, if necessary, together. The invention also allows a distribution of the vertical movement of the workpiece to two workpiece carriages which move the workpiece arranged next to each other. The tower-like design has space advantages because the tower can be positioned easier in the machining station, that means an expensive, frame-like stand construction for the adequately large workpiece carriage, as described above. This suggestion makes the application of the invention easier. Additionally the invention also allows that in the machining station more than one workpiece is provided, respectively stored. In this case, for example, each workpiece carriage would carry one workpiece each.

In another embodiment according to the invention it is suggested that one tower each is arranged on one side each of the conveying way. In this advantageous embodiment the conveying means, respectively the conveying way, is located between the two towers. Such an arrangement is convenient with regard to the stability of the complete machining station. The arrangement can be chosen in such a way that the center of gravity of the workpiece, respectively the workpiece with workpiece carrier (pallet) is located between the two towers and therefore only very small moments occur. In this respect this variant is an alternative to the stand constructions where the workpiece is picked up by a workpiece carriage which is, as a rule, arranged on the side of the conveying line. In this variant according to the invention it is possible to position the workpiece carriage above the workpiece.

In another variant of the invention it proposed that the machining station has two towers for the movement of the workpiece, the towers are arranged one behind the other in the direction of the transport of the workpieces and each tower is supported on both sides of the conveying way, each tower having an opening for the conveying way.

The second variant mentioned above for the use of towers offers a large number of interesting possibilities. The concept is also planned in such a way that the workpiece is picked up so that moments as small as possible occur. In the ideal case the workpiece is located between the two towers. If the towers are still arranged in the variant just described on both sides of the conveying way, the towers are, in this second variant, arranged along the conveying way one behind the other, with the possibility that the workpieces can be moved through the openings in the towers and thus reach the discharge point without any problems. This concept is suitable here for realising by means of a variant of towers the arrangement along, one behind the other on the conveying way as well as the arrangement on both sides of the conveying way.

Simultaneously this design also solves problems of the flow of workpieces. If for example, the machining stations according to the invention are located along a general conveying belt, which supplies serially interlaced stations, it is basically possible that the towers are arranged comparatively close to the conveying line and the conveying lengths for the feeding of the workpiece from the conveying line over the conveying means to the discharge point become very small.

In another variant where the machining stations has two towers one behind the other along the conveying way, it is even possible to convey the workpiece on the backside, realising in a very simple way a serial machining installation concept with the machining stations according to the invention.

In this arrangement where the towers are provided along the conveying way one behind the other it is clever to arrange the tool spindles between the two towers. In contrast to that, then the tool spindles are arranged parallel to the transport direction of the workpiece in the region of the conveying means when both towers are arranged on both sides of the conveying way. In the other variant where the towers are arranged along the way one behind the other the tool spindle axis forms together with the transport direction a sharp, in particular a right, angle.

According to the invention it is also provided that instead of two towers only one tower is used. This tower then is, if necessary, designed like a stand.

The concept according to the invention, however, also presents other possibilities in this field. If, for example, the two towers are equipped with one independent workpiece carriage each a plurality of opportunities for applications results.

At first, it is possible that each tower with its workpiece carriage is used autonomously. In a clever one-behind-the-other arrangement of the machining steps therefore the second workpiece carriage of the second tower can already bring the next workpiece, while the first workpiece is just being finished by the first workpiece carriage of the first tower. In this variant each workpiece carriage carries its own workpiece.

In another variant according to the invention it is provided that the workpiece, respectively the workpiece carrier carrying the workpiece, is moved by both workpiece carriages of both towers. It is an advantage here that both towers have a drive for their respective workpiece carriage. As the drive is distributed to the two towers these can be chosen correspondingly small dimensioned in order to achieve the same speeds of machining, nevertheless.

Naturally, it is convenient here that the drives of the two workpiece carriages in the towers are synchronised to each other, thus carry out the same movements. This is possible, however, by means of suitable control means without any problems.

According to the invention it is provided that the towers are designed standing individually. In another variant according to the invention, however, it is also possible that the towers are connected to each other in their upper regions, stiffening each other and increasing the stability accordingly.

The concept with the towers according to the invention allows in particular the use of machining stations in a machining installation working serially as well in one working parallel without larger effort for altering the machining stations.

The machining stations according to the invention are used for triple, quadruple or quintuple machinings. Besides the three translator axes X, Y, Z, of course, also the rotational axes A, B are provided. In the embodiment of the invention with towers these may as well be realised.

It is provided here that the workpiece carriages of both towers have a common rotational axis, indicated here as rotational axis A. Therefore it is possible that at least a quadruple machining can be achieved by the concept according to the invention. As according to this concept two workpiece carriages (one on one tower each) are provided for the movement of the workpiece, also each workpiece carriage has one rotational drive each for the common rotational axis, naturally also these rotational drives conveniently being synchronised to each other. Alternatively the two workpiece carriages have independent rotational axes A each.

Naturally it is also provided that the workpiece carriage for the workpiece has a rotational drive for a rotational axis B which is parallel to the direction of movement of the workpiece carriage. Here the invention also offers considerable advantages. Basically it is possible that the machining station machines on two or more workpieces at the same time. In this case an independent rotational axis B (parallel to the direction of movement of the workpiece carriage) can be offered for one workpiece each. Alternatively it is, of course, also possible that only one such rotational axis is provided.

It is, for example, convenient to connect the workpiece carriages of both towers to each other by means of a bridge, the bridge being able to rotate the workpiece around a rotational axis B parallel to the direction of movement of the workpiece carriages. By means of the use of the bridge it is basically possible that not only one but also several workpieces are picked up and be moved by the two workpiece carriages. This also presents a possibility to bring several workpieces into the machining station, reaching appropriate machining advantages in particular in connection with a multi-spindle machining unit.

In a development according to the invention it is also provided that each individual workpiece can be rotated around parallel rotational axes B, if necessary also independently from each other.

In another embodiment according to the invention it is provided that the conveying means carries out the feeding as well as the removal of the non machined, respectively finished, workpieces. It has to be pointed out here that for conveying of the workpiece different definitions can be chosen, however, without seeing a constructive difference from that. The different definitions are chosen for the unambiguous indication of the objects. It is actually possible that also a conveying line carries out corresponding removal and feeding tasks as the conveying means mentioned above. Vice versa it is possible that the conveying means is generally part of the conveying line.

The conveying means is designed in particular depending on the concept of the installation (parallel or serial machining). In a parallel installation concept conveniently two belts are provided which are independent, the first one conveying raw parts and the second one finished parts, each with regard to the machining step. Accordingly the conveying means will feed non-machined raw parts and convey back finished workpieces. The arrangement of the two belts is here done conveniently either next to each other or one above the other. An arrangement of one above the other saves space. In a serial installation concept it is possible to use only one conveying means.

In a preferred embodiment it is provided that the conveying means has a feeding and a removal means, on the feeding means the non-machined workpieces being approached and on the removal means the finished workpieces being conveyed away. Of course, such a concept can be applied in a serial as well as in a parallel used machine. In order to save space it is suggested that the feeding means and the removal means are arranged one above the other. A certain order is not decisive here, it may change, if necessary.

The invention suggests furthermore that two or more workpieces are clamped together on one workpiece carrier or on a bridge between the workpiece carriages of the two towers. Such a procedure makes it possible that several workpieces are machined on simultaneously, increasing the metal cutting performance of the machining installation according to the invention correspondingly. It is an advantage here that the machining station has two or more tool spindles and the machining station simultaneously machines two or more workpieces.

According to the invention it is possible that the workpieces are arranged on the workpiece carrier in longitudinal direction of the conveying way or rectangular to it. If, in particular, the workpiece has to be removed over the same conveying way again from the machining station as it has been approached, the arrangement one behind the other has advantages in the machining speed, respectively the changing speed of the workpieces.

The invention is not limited with regard to the number of workpieces which are to be machined simultaneously in a machining station. It is, indeed, possible that several workpieces are moved, respectively rotated, by one or more workpiece carriages in the same way or at least partly differently. This arrangement can be realised in machining stations where only one workpiece carriage is provided for the movement of the workpiece, as well as in the arrangement with two towers. The invention is in no way limited to the suggestion that the workpieces can, in such an arrangement, only move in the same way. Basically it is possible that at least a part of the workpieces can be moved or rotated differently.

Other variants according to the invention are described in the sub-claims.

BRIEF DESCRIPTION OF THE VARIOUS VIEWS AND DRAWINGS

Figure 4:
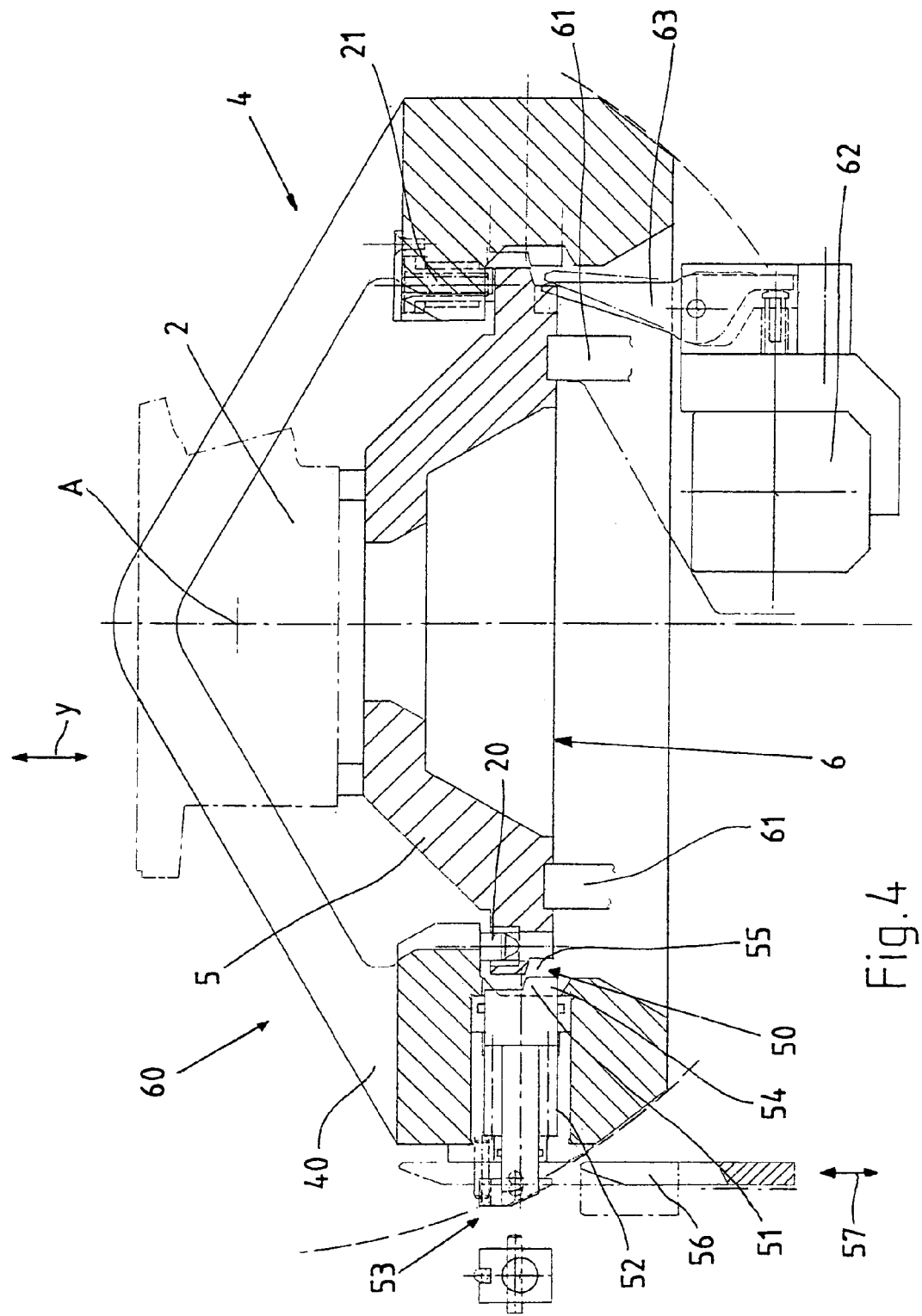
Figure 15:
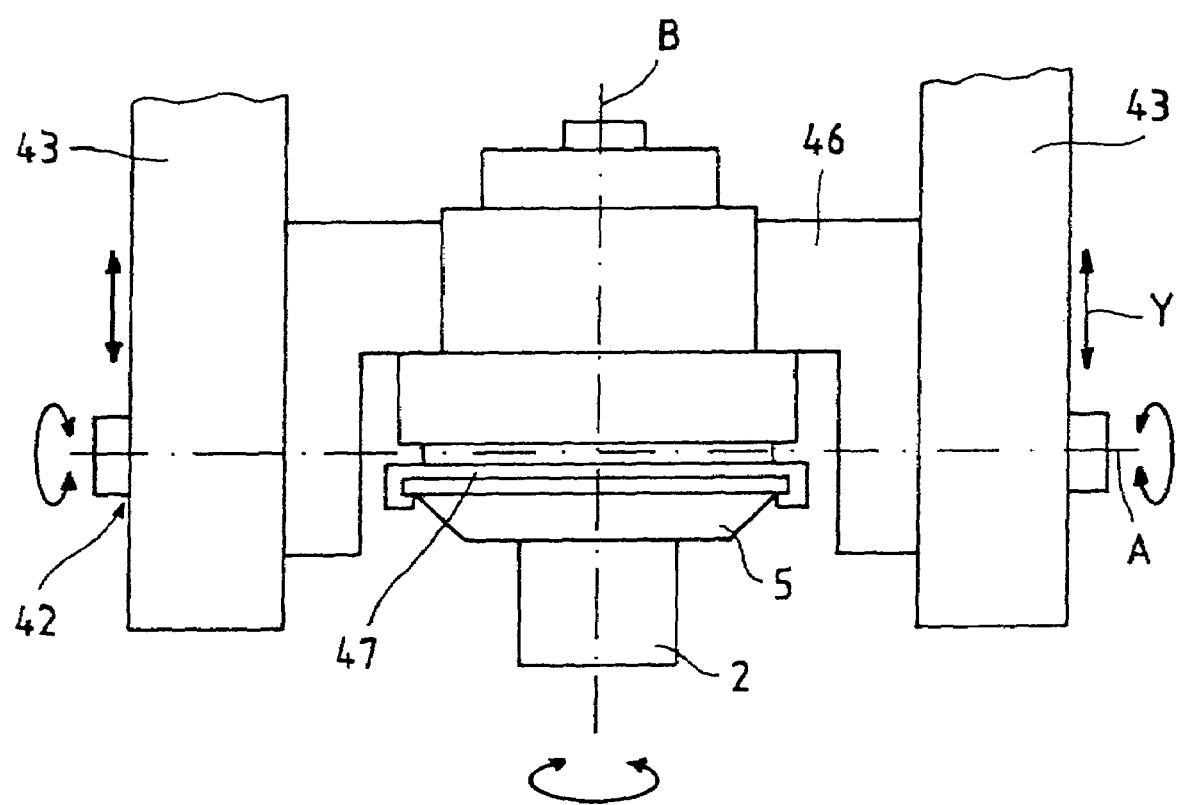
Figure 16:
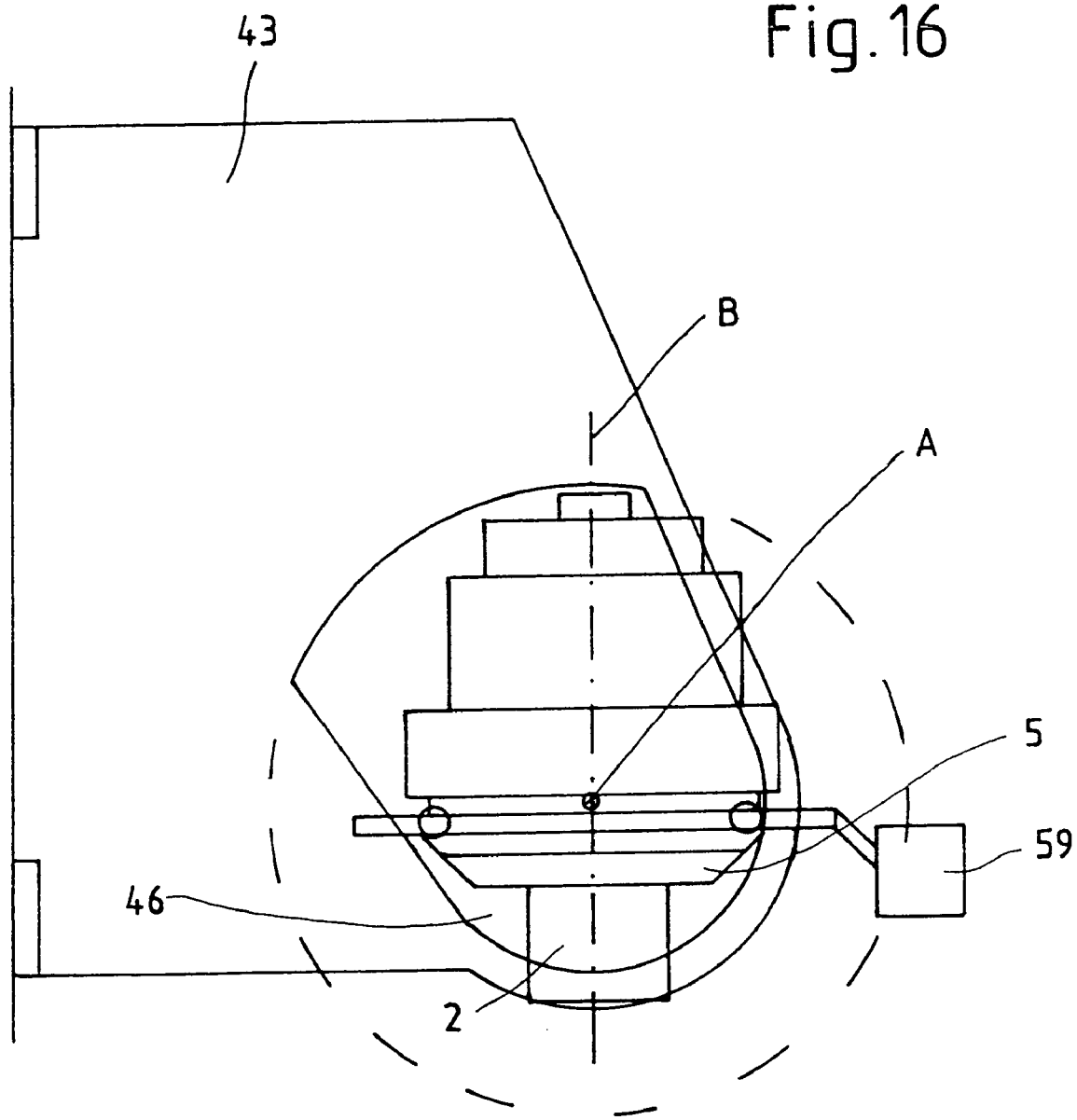
Figure 19:
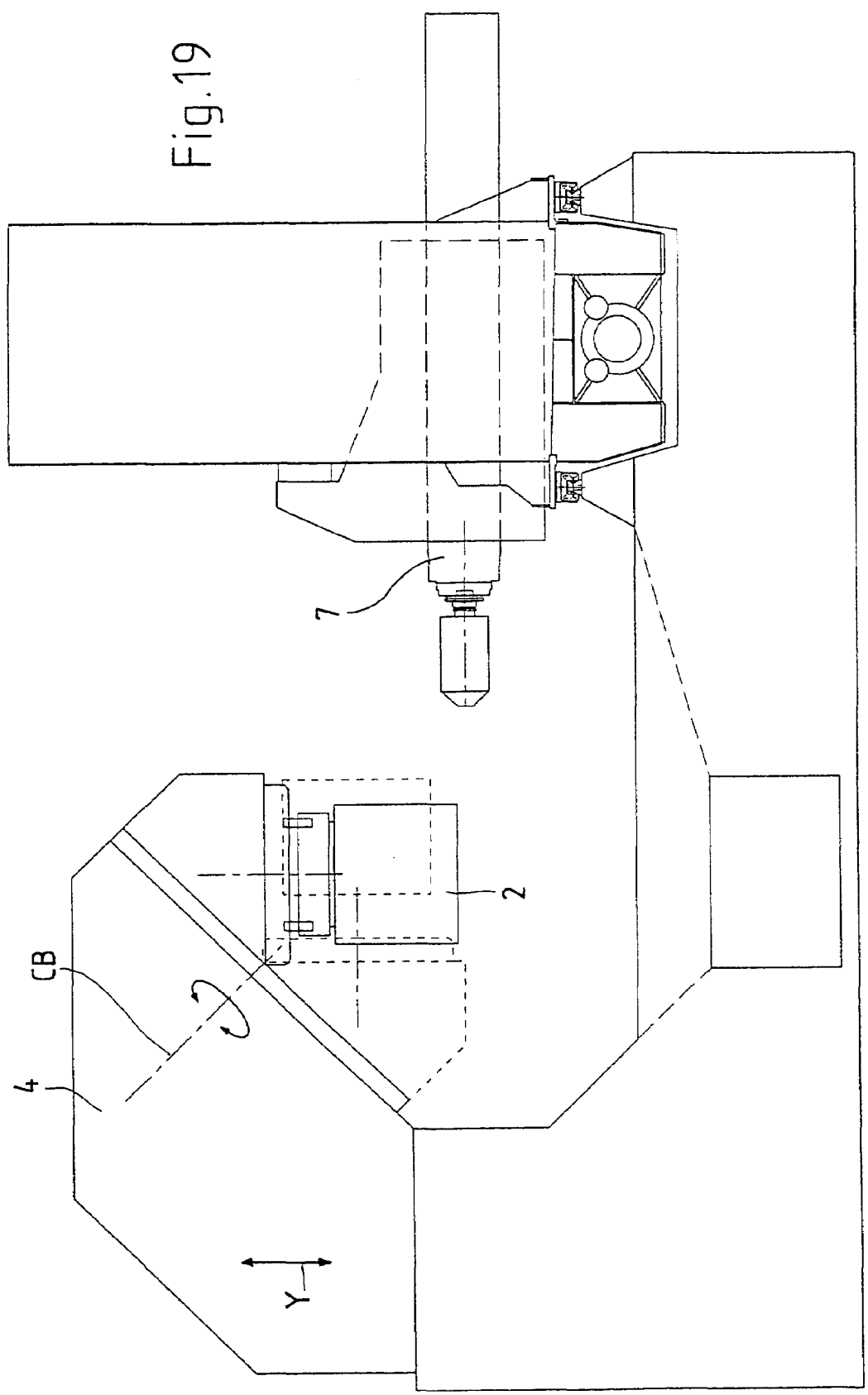
Figure 20:
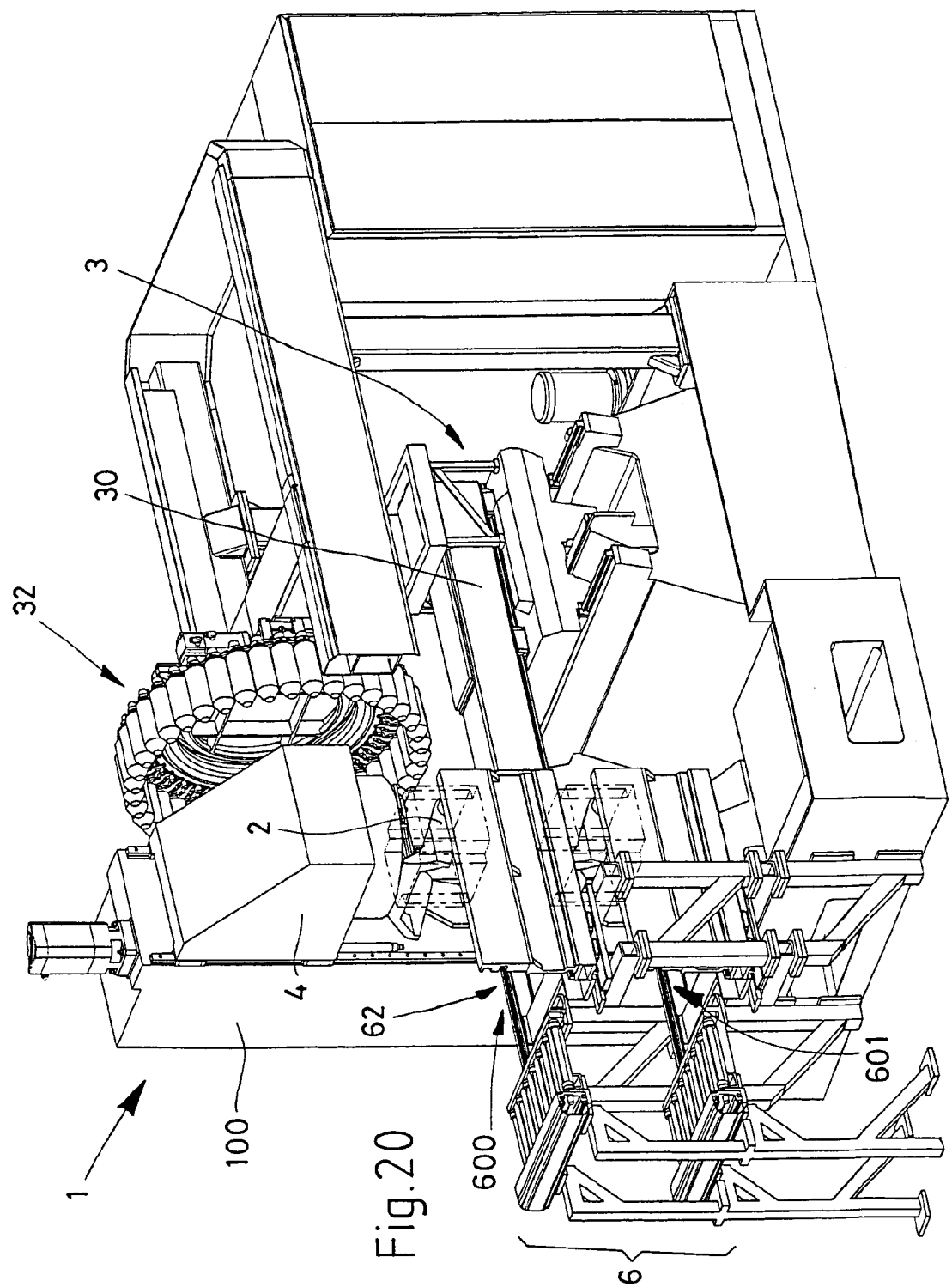
Figure 21:
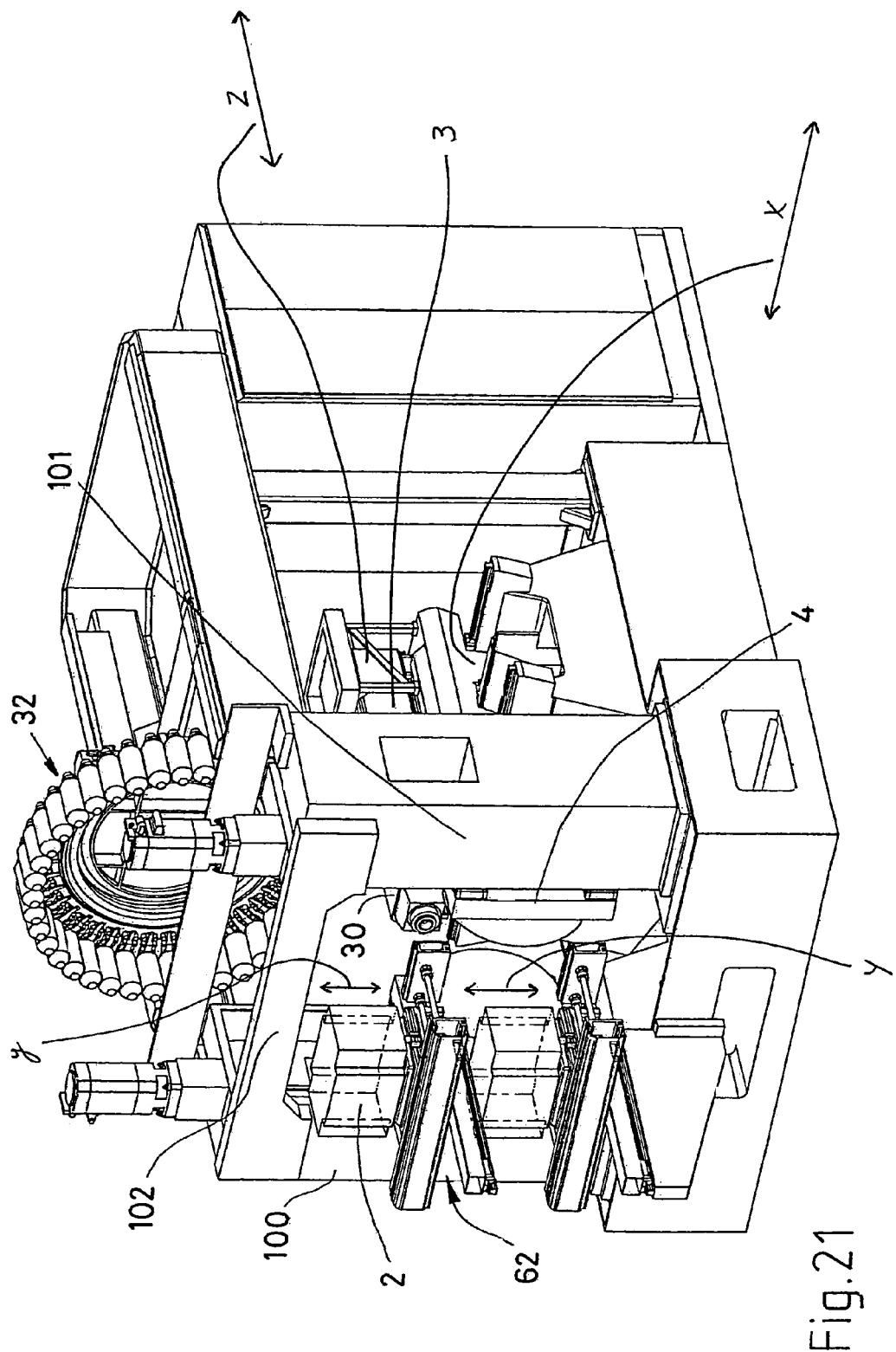
Figure 22:
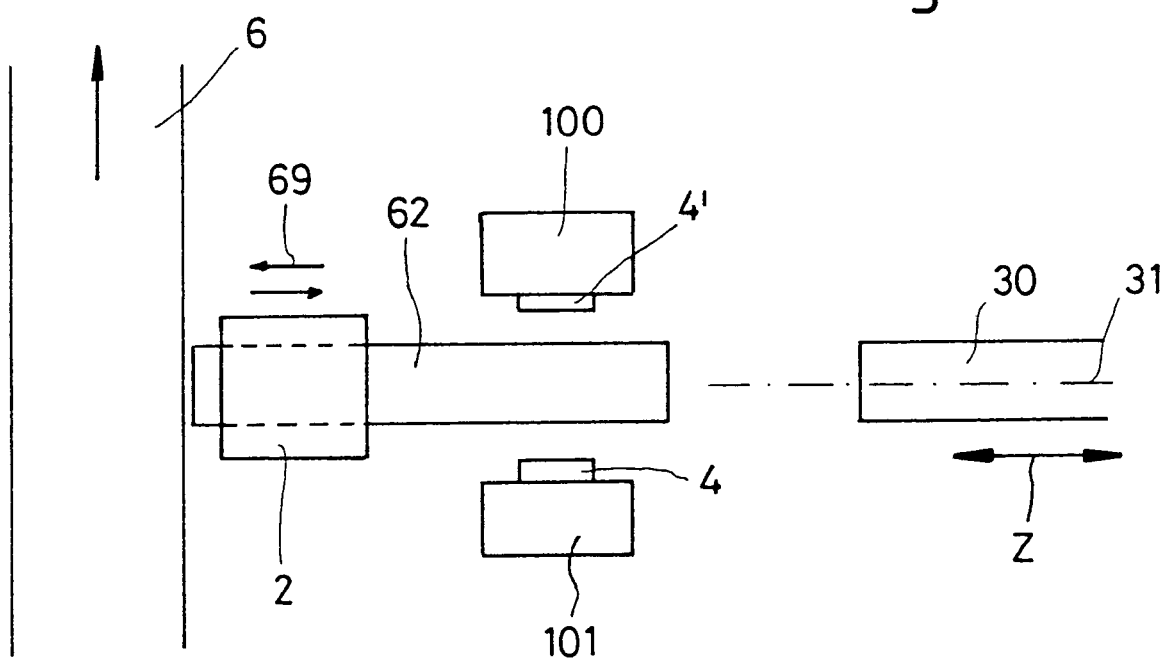
Figure 26:
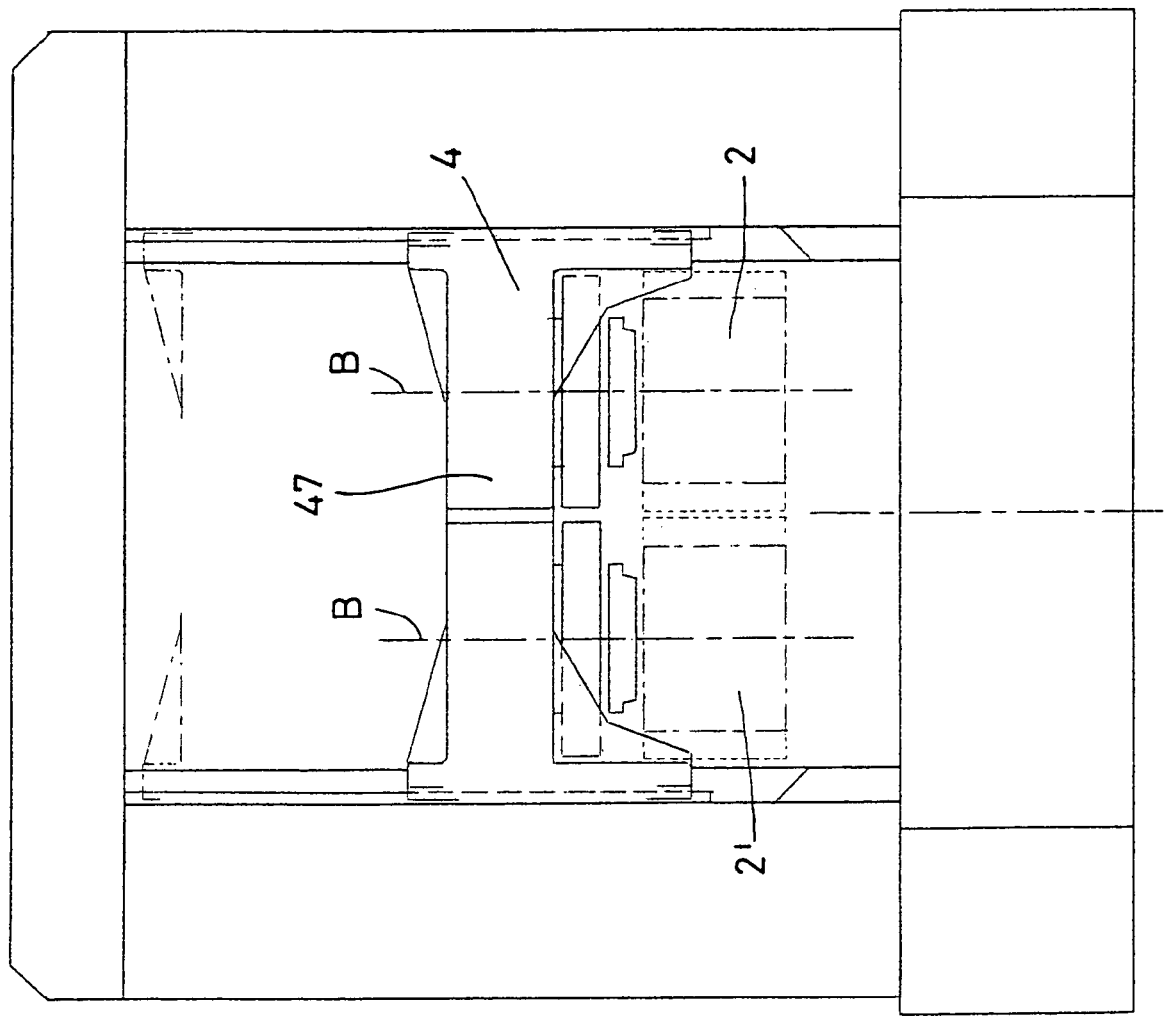
Figure 27:
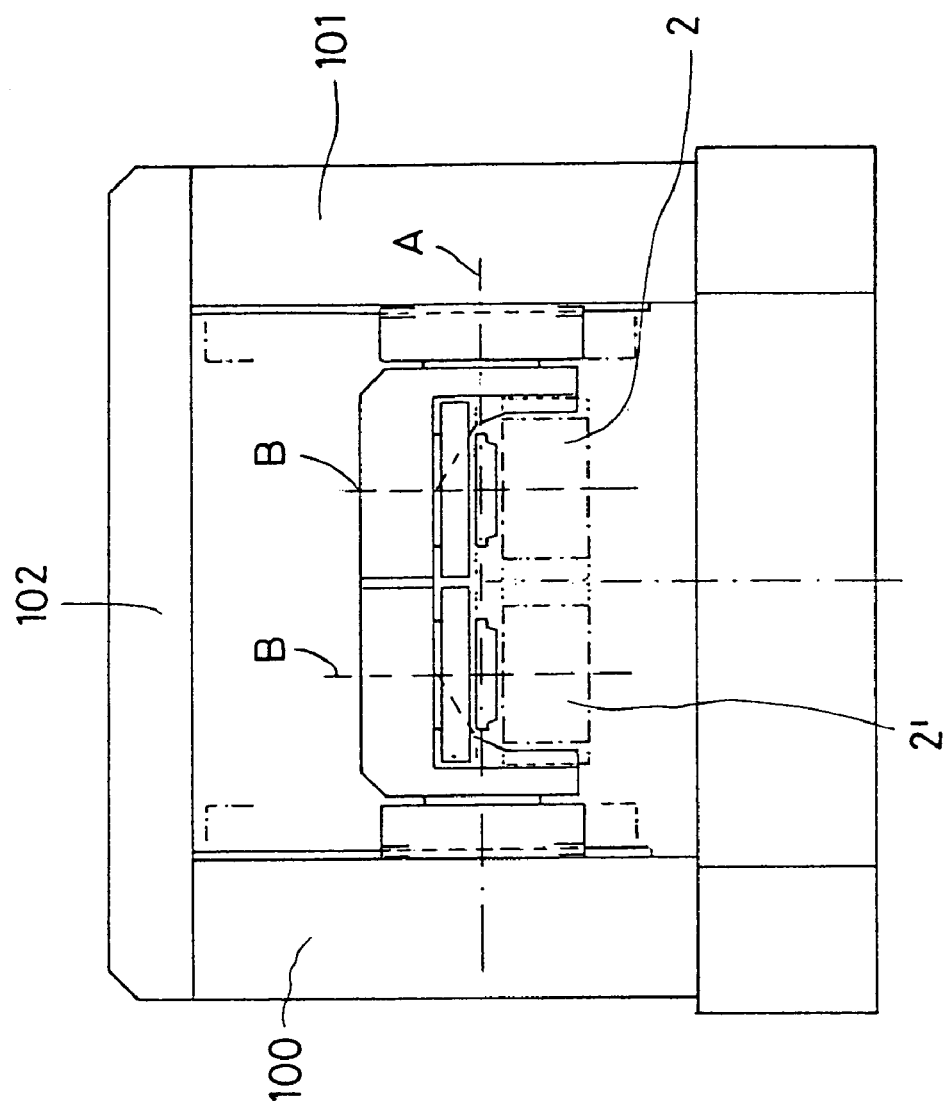
Figure 28:
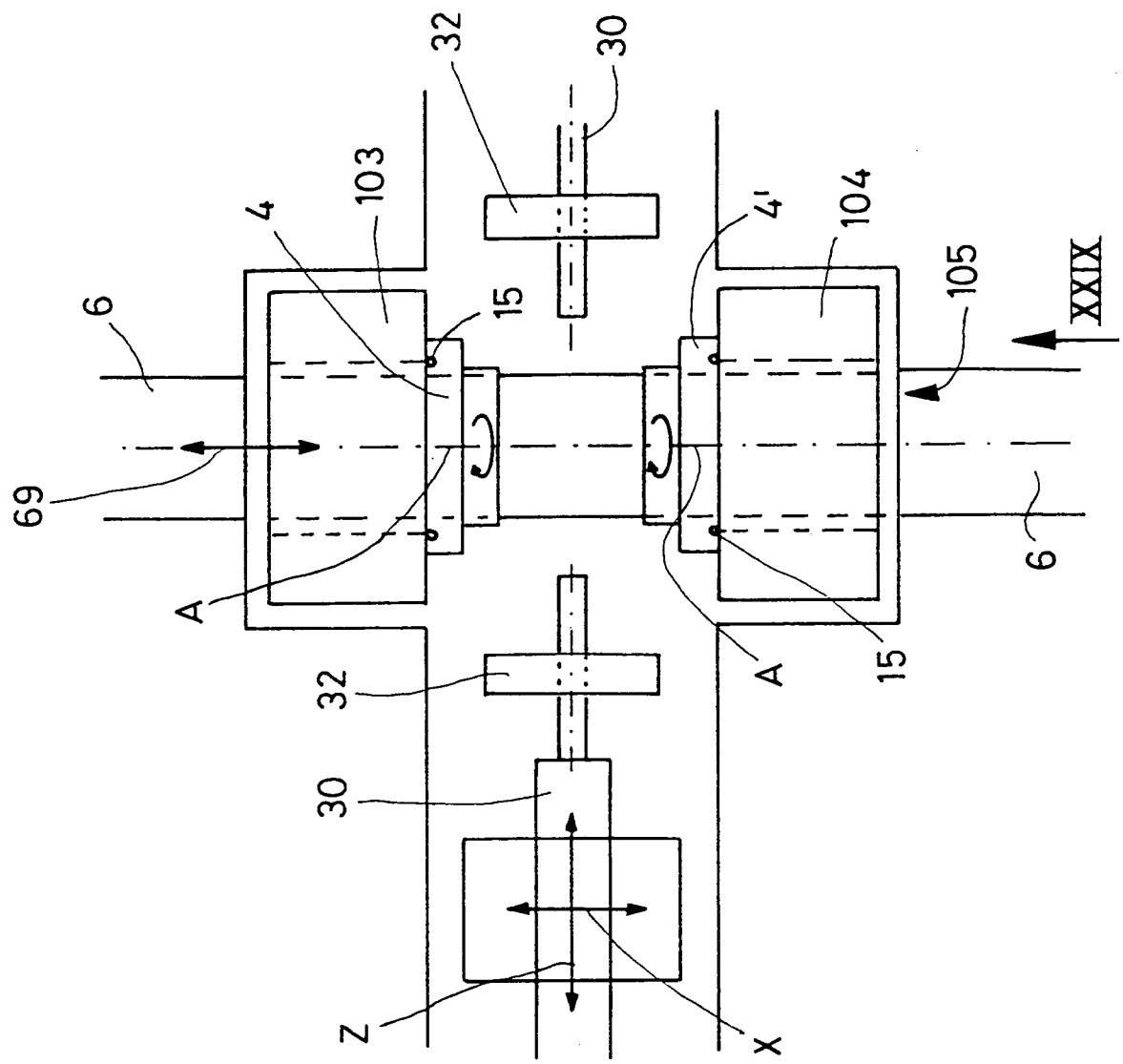
Figure 29:
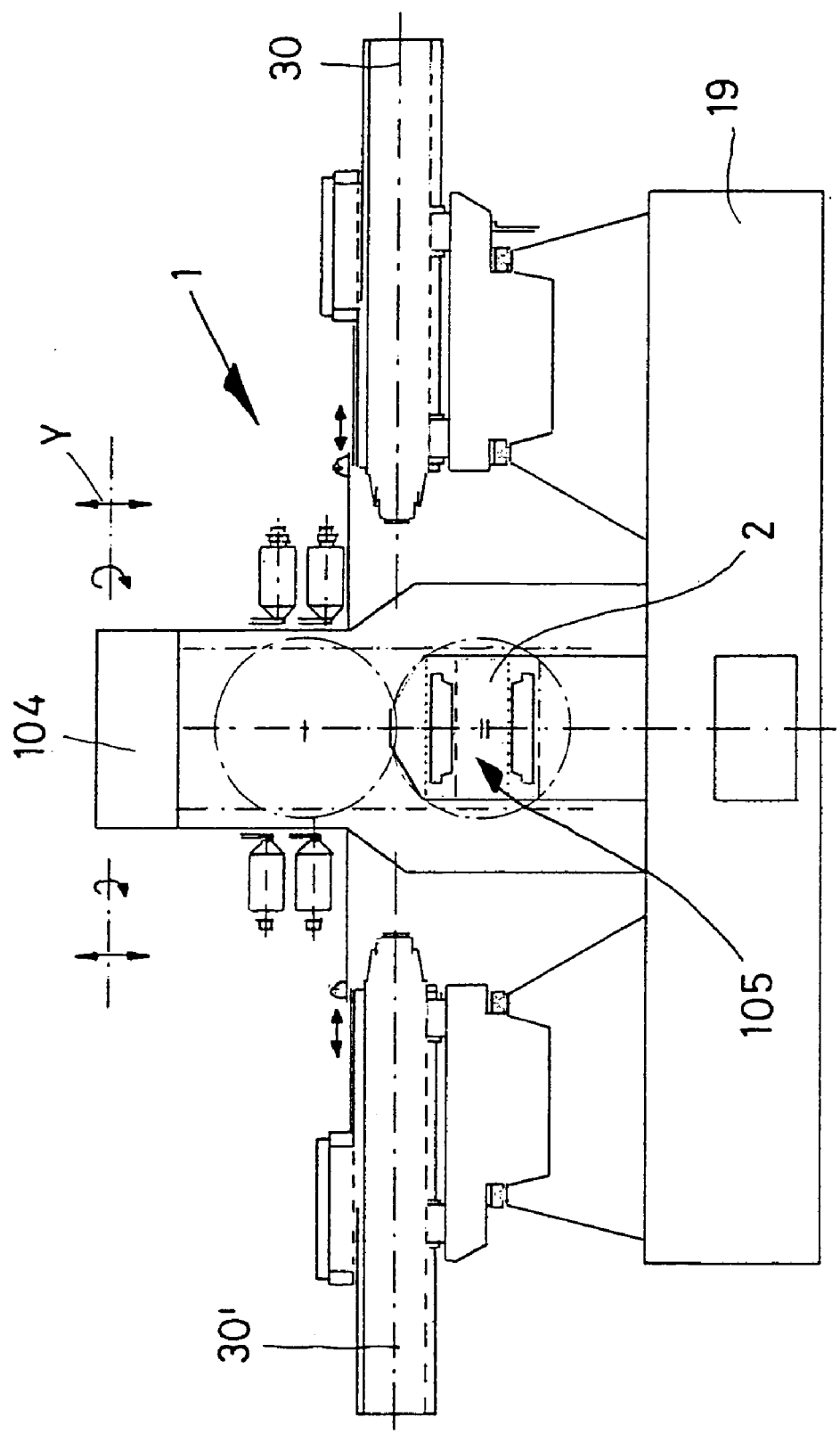
Figure 30:
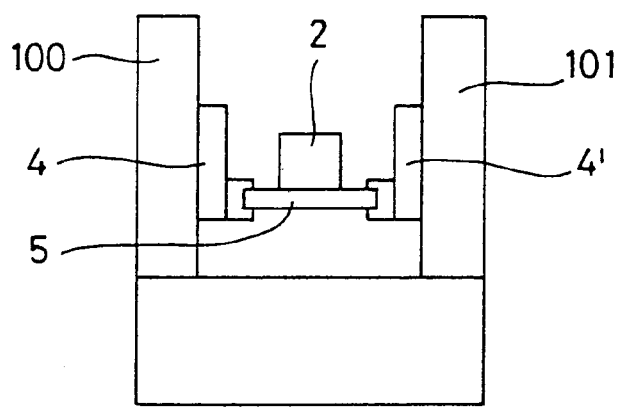

The invention is shown schematically in the drawing. The figures show:

FIG. 1, 2, 3, 5, 6, 7, 8, 9, 12, 13, 14, 17, 18 Each a three dimensional view of different variants of the invention, FIG. 4 a view, partly as a section, of a detail of the invention, FIG. 10 a view of a detail of the invention, FIG. 11 a side view according to FIG. 10, FIG. 15 a view of another detail of the invention and FIG. 16 a side view according to FIG. 15, FIG. 19 a view of another detail of the invention, FIG. 20, 21 a three dimensional view of another variant of the machining station according to the invention, FIG. 22 a top view of a schematic drawing of the arrangement according to FIG. 21, FIG. 23 to 27 each a view of different details of the invention, FIG. 28 in a schematic top view another variant of the machining station according to the invention, FIG. 29 a detailed view of the concept according to FIG. 28, along the arrow XXIX and FIG. 30, 31, 32 a view of further variants of the invention.

DETAILED DESCRIPTION OF THE PREFERRED EMBODIMENTS

The machining station 1 according to the invention is shown, for example, in FIG. 1. It comprises essentially the machining unit 3 which serves for machining workpieces 2. The machining unit 3 can move along the Z-axis, which is parallel to the spindle axis, and can, if necessary, also move rectangular to that in the X-axis. Z- and X-axis are here horizontally, respectively essentially horizontally, orientated. The vertical axis (Y-axis) is represented by the workpiece carriage 4 which carries the workpiece 2 in particular during the machining or to the machining.

The machining station according to the invention is often part of a machining installation, also according to the invention, for example of a transfer line. Here a plurality of machining stations arranged one behind the other are connected by a conveying line 6. 64 indicates her the region of the conveying line 6 where the workpiece 2 is conveyed in. FIG. 1 shows the situation in which the workpiece 2' clamped on the workpiece carrier 5' is just leaving the machining. The machining has already been finished.

The workpiece carriage 4 is supported vertically movably in a stand 10. Conveniently the stand 10 is designed frame-like in order to increase the stability for the movement of the workpiece carriage 4. Here the stand 10 comprises, for example, four columns orientated essentially vertically which are connected frame-like and form a guide for the carriages of the workpiece carriage 4, which are not shown in detail. The carriage 4 may have one or two or more carriages for the guide on the respective vertical stand parts. In the region of the stand 10, below the carriage 4, the discharge point 60 is located. In the front and behind of that each the conveying line 6 is connected to the discharge point. The conveying line 6 is often designed as friction roller conveyor and allows an independent drive of the workpiece carriers 5. In the region of the discharge point 60 sliding rails 61 are used; however, in the same way a friction roller conveyor can pass through.

Another advantage of the invention lies in the fact that the Y-workpiece carriage allows not only a movement of the workpiece for positioning, respectively during the machining of the workpiece in Y-direction (vertical direction), but also a turning of the workpiece. For that purpose the workpiece carriage 4 has a rocker-like design, which means that the workpiece carrier 5 held by the workpiece carriage 4 is supported rotationally around a horizontal axis A. The horizontal axis A is here essentially parallel in the direction of the conveying line 6. In particular, the rotational axis A is rectangular to the spindle axis 31, on the one hand, and rectangular to the direction of movement Y of the workpiece carriage 4, on the other hand.

Because the workpiece 2 can be turned around the rotational axis A it is possible that a multi-lateral machining of the workpiece or a machining under space angles is possible. Conveniently here a turning of the workpiece 2 around the rotational axis A up to 360° is provided.

In a preferred embodiment of the invention it is suggested that the position of the rotational axis A is chosen in such away that it contains, if possible, the center of gravity of the workpiece 2, if necessary the common center of gravity of workpiece 2 and workpiece carrier 5. By means of such a design tilting moments are kept as small as possible or even avoided. Such a design increases the accuracy of the machining. If necessary, it is provided to vary the position of the workpiece carrier with regard to the workpiece carriage in order to achieve a corresponding adjustment even with different workpieces.

Conveniently the machining unit 3 can be moved and positioned, for example, by means of one or more tool spindles 30 essentially rectangular to the movement of the workpiece carriage 4. This corresponds with a movability of the machining unit in the horizontal plane indicated by the axes X and Z. However, it may also only one movement in Z-direction be provided.

As it has already been discussed the invention does not only offer an advantage in the machining of a workpiece 2. It is also proposed to support, for example, the tool magazine 32 on the workpiece carriage 4. By means of that it is achieved that during tool changes, during which a picking up of the workpiece by the workpiece carriage 4 is impossible anyway, the workpiece carriage 4 is used, although, in a reasonable way. In this case the workpiece carriage is lowered so far that the tool magazine 32 can approach the machining unit 3 and the tool change can take place as usual. The constructive advantages included here, but also the efficient machining operation, are evident.

Figure 2:
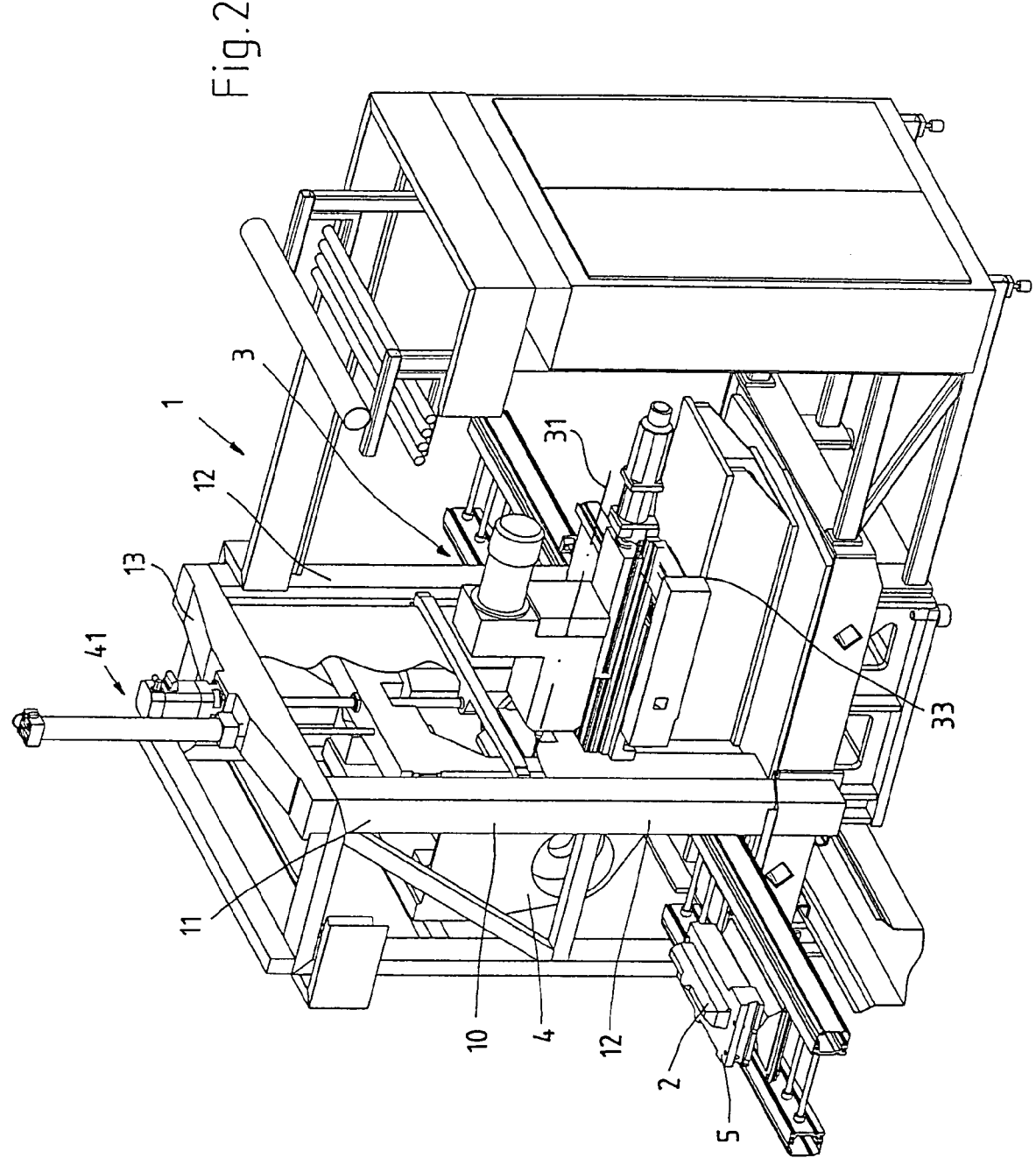

In FIG. 2 another variant of the machining station 1 according to the invention is shown. Here the machining unit 3 is designed as tool spindle 30. However, also other machining devices, for example a laser head or the like, may be used. The machining unit 3 is supported movably parallel to the spindle axis 31 on the bearing 33. Here this direction of movement is rectangular to the direction of movement of the workpiece carriage 4. In this backside view it can be seen clearly that the machining unit 3 grips from behind through a frame-like embodiment 11 of the stand 10 and thus machines the workpiece 2. The frame 11 is formed here essentially by the vertically orientated stand parts 12 which are connected on their upper and, if necessary, also on their lower end by adequate transverse beams 13. The upper transverse beam 13 here takes the driving elements 41 of the workpiece carriage 4.

Figure 3:
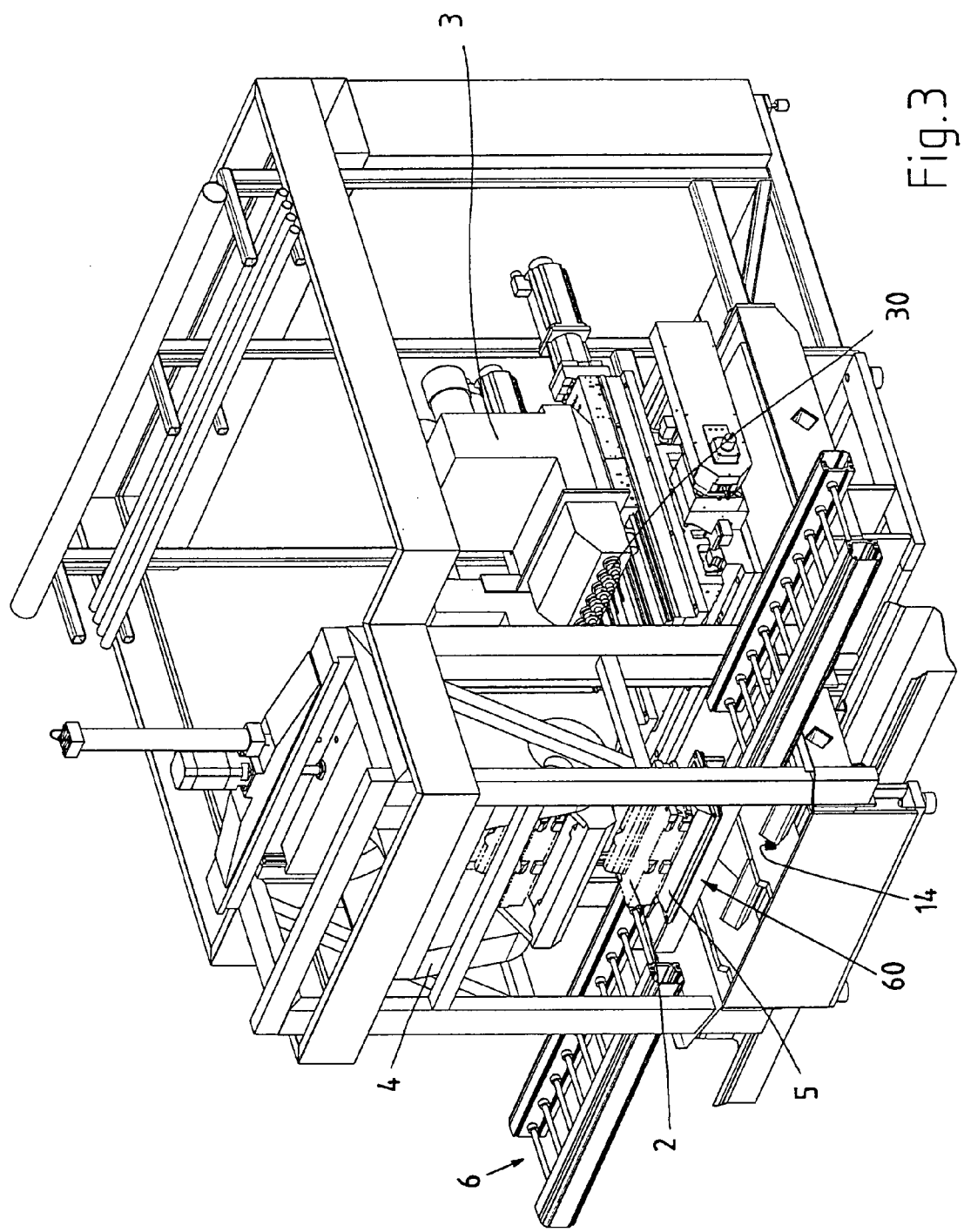

In FIG. 3 another variant of the machining station 1 according to the invention is shown. Instead of one tool spindle 30 according to FIG. 2 in this example a plurality of tool spindles 30 are positioned next to each other on one line. Naturally also on different height levels corresponding tool spindles can be arranged. In the embodiment shown here the machining unit 3 is drawn back in Z-direction. The tools which are fixed on the front ends of the tool spindles are not engaged with the workpiece 2.

The fact that the workpiece 2 can be turned around the rotational axis A allows also a dry machining of the workpiece, which means that the use of cooling liquids can be abandoned. It is taken care then that a machining of the workpiece 2 is carried out in such a way that the chips can fall down without hindrance into the chip conveying trough 14 and be removed from there. If necessary, the machining unit 3 then does not carry out a movement, orientated essentially vertically, but is turned, if necessary, also in the space in order to allow a machining from below. A corresponding mutual orientation of the position of the spindle axis 31 and the workpiece 2 is possible without any problems.

In FIG. 4 a detail of the machining station 1 is shown. This deals in particular with the clamping device 50. In the example shown here the workpiece carrier 5 is supported for the time being on the sliding rails 61 in the region of the discharge point 60. The workpiece carrier 5 carries the workpiece 2. The situation is shown where the workpiece carriage 4 grips the workpiece 2, respectively the workpiece carrier 5 carrying the workpiece 2. For a safe connection of the workpiece carrier 5, respectively the workpiece 2, with the workpiece carriage 4 the clamping device 50 is provided. That is indicated essentially in the left hand part of the drawing. For a secure positioning of the workpiece carrier 5 with regard to the workpiece carriage 4 an indexing unit 20 is provided. This comprises two positioning pins which are arranged at the workpiece carriage and dip in corresponding borings of the workpiece carrier 5. By means of that an exact positioning of the workpiece carrier with regard to the workpiece carriage 4 is achieved, which is necessary for a highly accurate machining. The dipping of the positioning pins into the corresponding borings is carried out during the lowering movement of the workpiece carriage 4, which is provided anyway, in the discharge point 60.

In the example shown here the clamping device 50 on the workpiece carriage 4 is formed by a spring-operated holding device 51 which co-operates with the workpiece carrier 5 in the position where the spring is disengaged. The workpiece carriage 4 is here, for example, designed as a swivel frame 40. In this position the holding device 51 holds the workpiece carrier 5. The holding device 51 can be moved back against the force of the spring 52 in such a way that the workpiece carrier 5 is released. The holding device 51 has a suitable nose 54 which engages through a corresponding undercut 55 in the workpiece carrier 5 and thus forms a non-positive connection. The exact positioning is determined by the position of the indexing unit 20.

A releasing unit 53 is provided which moves during a movement of the workpiece carriage 4 towards the discharge point 60, in particular during a lowering movement (in Y-direction) of the workpiece carriage 4, the holding device 51 for releasing or taking the workpiece carrier. The releasing unit comprises the wedge 56 which has a flattening on its front end. This flattening, working as a control edge, serves for co-operating with a corresponding recess on the holding device 51 and moving it correspondingly against the force of the spring 52. In the disengaged condition of the spring 52 the holding device 51 is shifted to the right, and the nose 54 engages in the undercut 55. By means of the co-operation of the wedge 56 with the corresponding recess a force against the force of the spring 52 is impressed and the holding device 51 is shifted to the left in order to either release the delivering workpiece carrier or to move backwards the holding device 51 in a gripping movement so far back for the time being that it does not collide with the workpiece carrier 5.

In the example shown here the releasing unit 53 is able to move along the double arrow 57, making the place where the releasing unit 53 acts on the holding device 51 variable for the gripping, respectively the releasing, of the workpiece carrier 5. Therefore it is possible, for example, to let the holding device run back in another position, as it is necessary, for example, for gripping. The direction of movement which is indicated by the double arrow 57, is here parallel to the direction of movement of the workpiece carriage 4 (Y-axis).

In order to avoid an undesired jamming of the workpiece carrier 5 with the workpiece carriage 4 just when it is released a pushback unit 21 is provided at the workpiece carriage, respectively the workpiece carrier. This contains, for example, one or more pushback bolts, which are supported on springs, the spring force of which is orientated in such a way that they try to push back the workpiece carrier 5 when it is released. Through the use of a spring a passive, actually always functioning, means is offered.

For removing the workpieces, respectively the workpiece carriers 5 carrying workpieces, on the conveying line 6 corresponding friction roller drives are provided. These driven rollers running with friction are a proven means for the drive of unit loads, for example workpiece carriers carrying workpieces. This concept can alternatively also be used in the discharge point 60. Alternatively, however, it is suggested here also that the workpiece carriers 5 are supported on sliding rails 61 and that a separate feeding and removing device 62 as conveying means 62 is provided in the discharge point. For example a pneumatic cylinder or a spindle drive or the like may be provided which engages non-positive through an also springed catch 63 in a corresponding groove on the lower face of the workpiece carrier 5 and thus effects a movement of the workpiece carrier 5 at least along the sliding rails until the conveying line.

Figure 5:
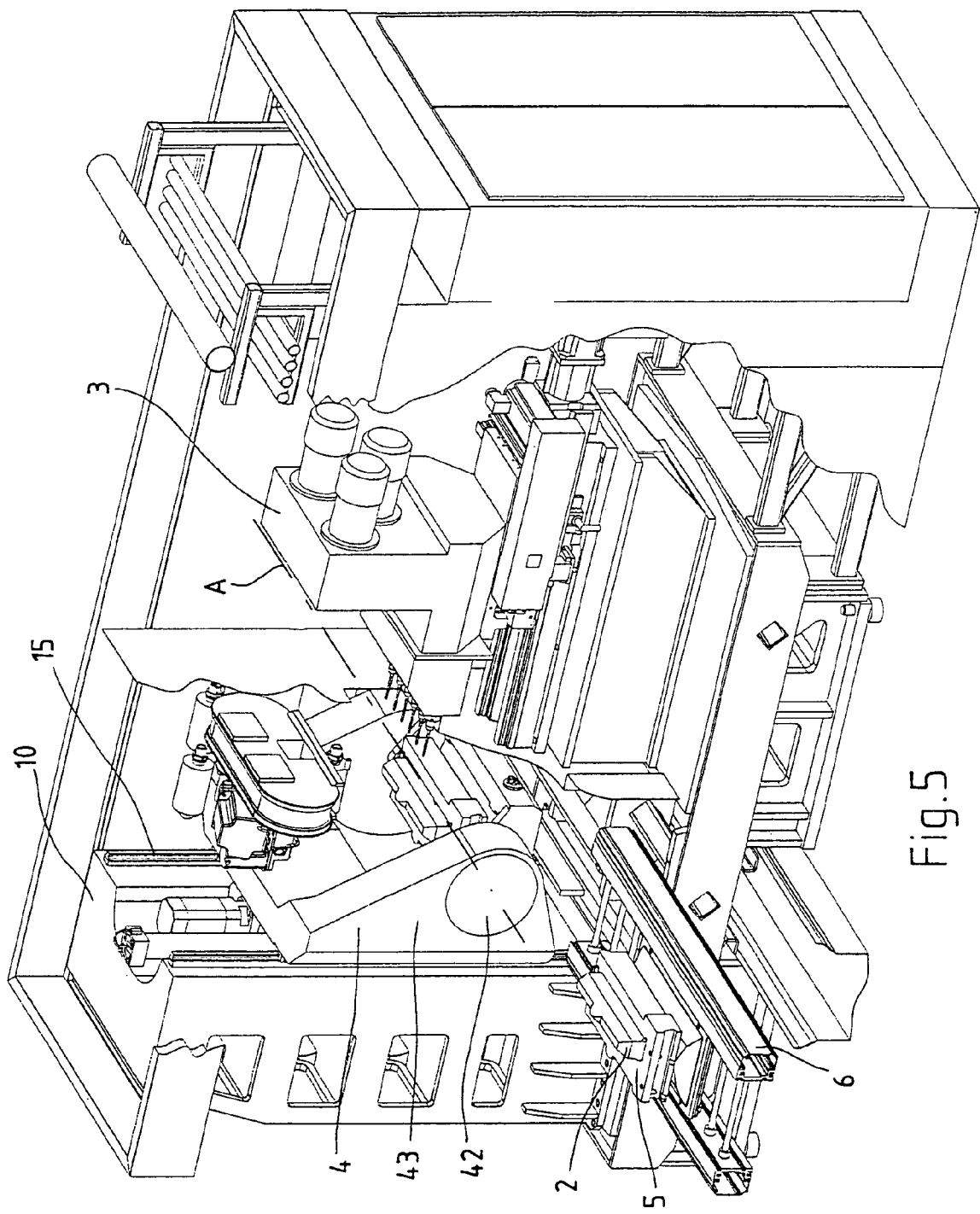

In FIG. 5 the invention is shown in such a way that the workpiece carriage 4 is not supported in a frame, as shown in FIG. 1 or FIG. 2, but an extra stand 10 is provided for that purpose on the side of the conveying line 6 directly opposite the machining unit.

The hinged bearing 42 can be seen clearly which allows a turning of the workpiece carrier 5, respectively the workpiece 2, around the rotational axis A. The hinged bearing 42 is here provided rocker-like as a 360° joint on the laterally projecting cheeks 43 of the workpiece carriage 4. Here two cheeks 43 are provided between which the workpiece 2, respectively the workpiece carrier 5, is arranged.

In the vertically extending parts of the stand 10 guide rails 15 for the support of the guide shoes of the workpiece carriage 4 are arranged.

Figure 6:
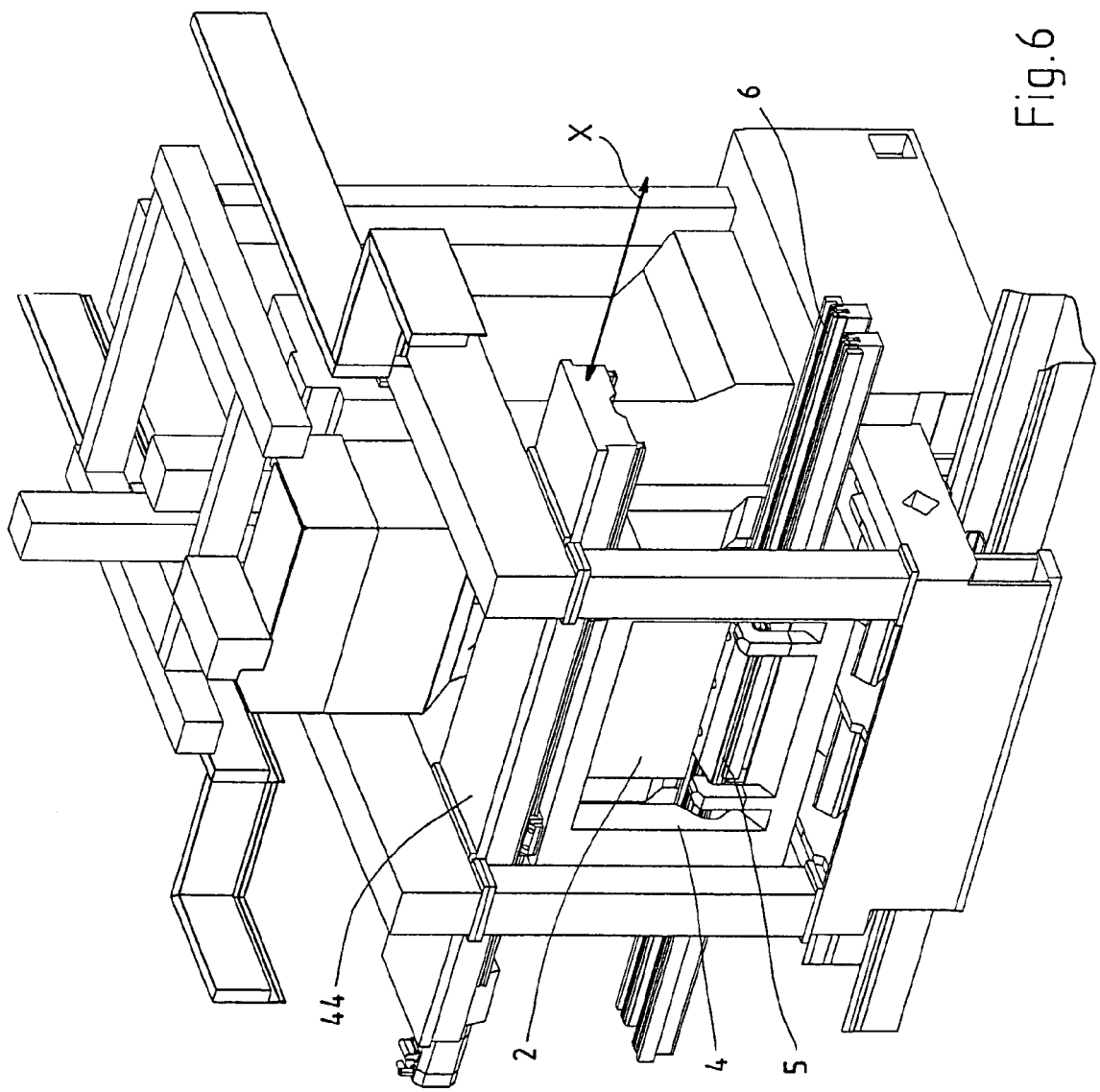

In FIG. 6 another variant of the invention shows that the workpiece carriage 4 also moves horizontally. This movement is carried out along the guide 44 which is provided on the frame in the upper region on traverse beams and allows a movement along the X-axis (parallel to the direction of the conveying line 6).

Figure 7:
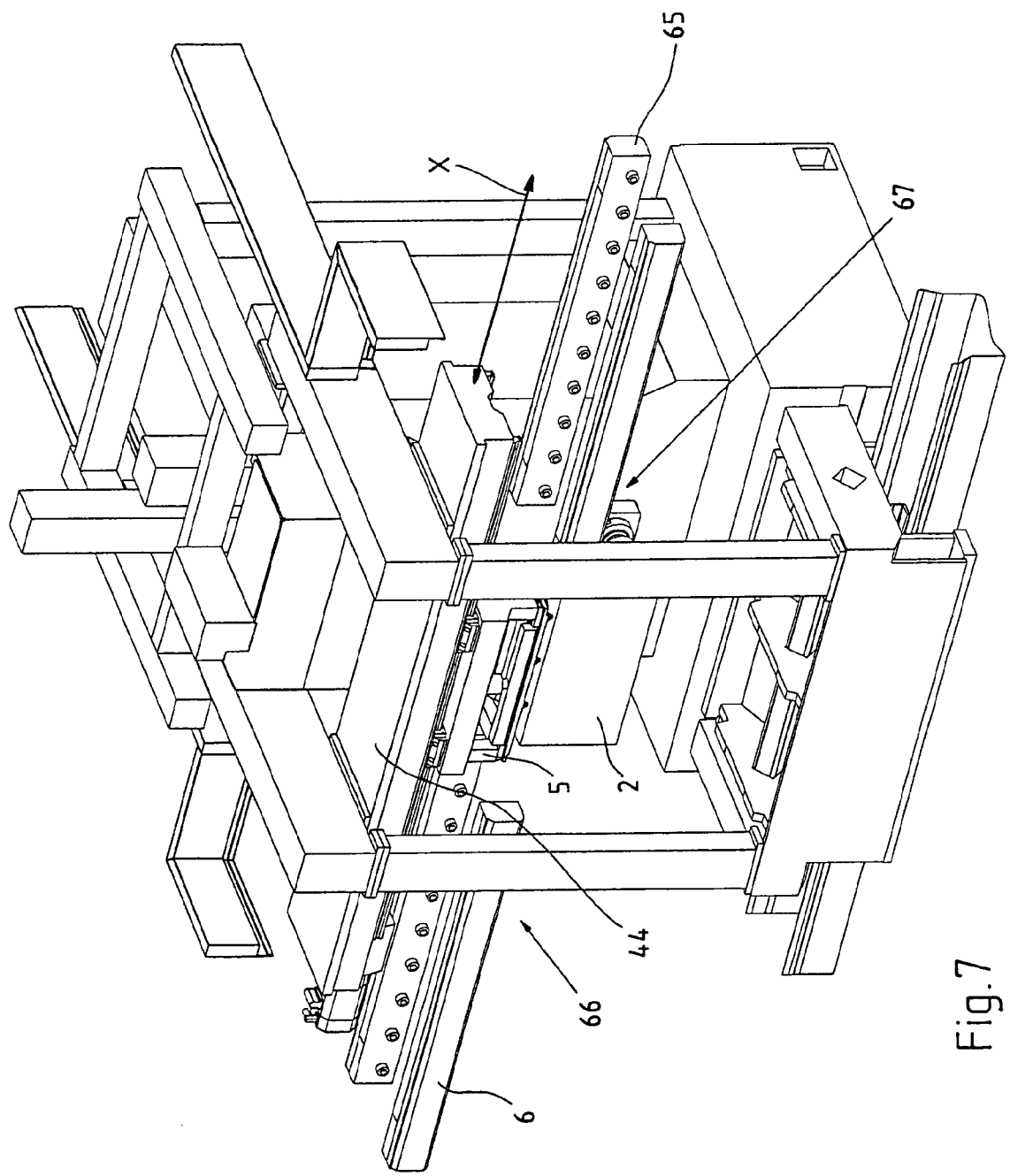

In any case, in FIG. 7 it is provided that the workpiece 2 is not only lifted by the workpiece carriage 4 but also moved along the X-axis.

In FIG. 7 a suspended conveying of the workpiece 2 on the workpiece carrier 5 is shown. Here the workpiece 2 is located often in a so-called basket below the workpiece carrier 5. The workpiece carrier 5 is gripped from above by the workpiece carriage 4.

It can be seen clearly that the conveying line 6 is interrupted in the region of the machining unit and a conveying is carried out here in X-direction by means of the workpiece carriage. It is provided here that the line of motion 44 covers the respective end, respectively start, regions of the connected conveying line 6 so far that on the feeding side a first discharge point 66 is created and, analogously, in the removing region a second discharge point 67 for removing the workpiece. Here the guide 44 remains stationary, the carriage is guided on this guide line and allows a movement in the Y-direction rectangular (vertical) to it.

Because of the suspended arrangement of the workpiece below the workpiece carrier 5 the conveying line 6 contains two parallel extending guide rails 65 each with laterally arranged support rollers. The workpiece suspending downwards therefore is arranged between the guide rails 65. Also in this concept the advantage according to the invention is used, namely that the workpiece carriage 4 takes the workpiece and, without transferring to another positioning unit, the workpiece carriage simultaneously also takes care also of a positioning and, if necessary, for a movement of the workpiece during the machining.

Here, as well as in FIG. 6, another advantage is added that the workpiece can be moved not only along one, but along two axes, that means in a horizontally extending plane which is preferably orientated rectangular to the spindle axis. By means of that more complex machining steps become possible, the distribution of the different movement axes to the two aggregates, the workpiece carriage, on the one hand, and the machining unit, on the other hand, saves expenses in the realising and is equally comfortable.

Figure 8:
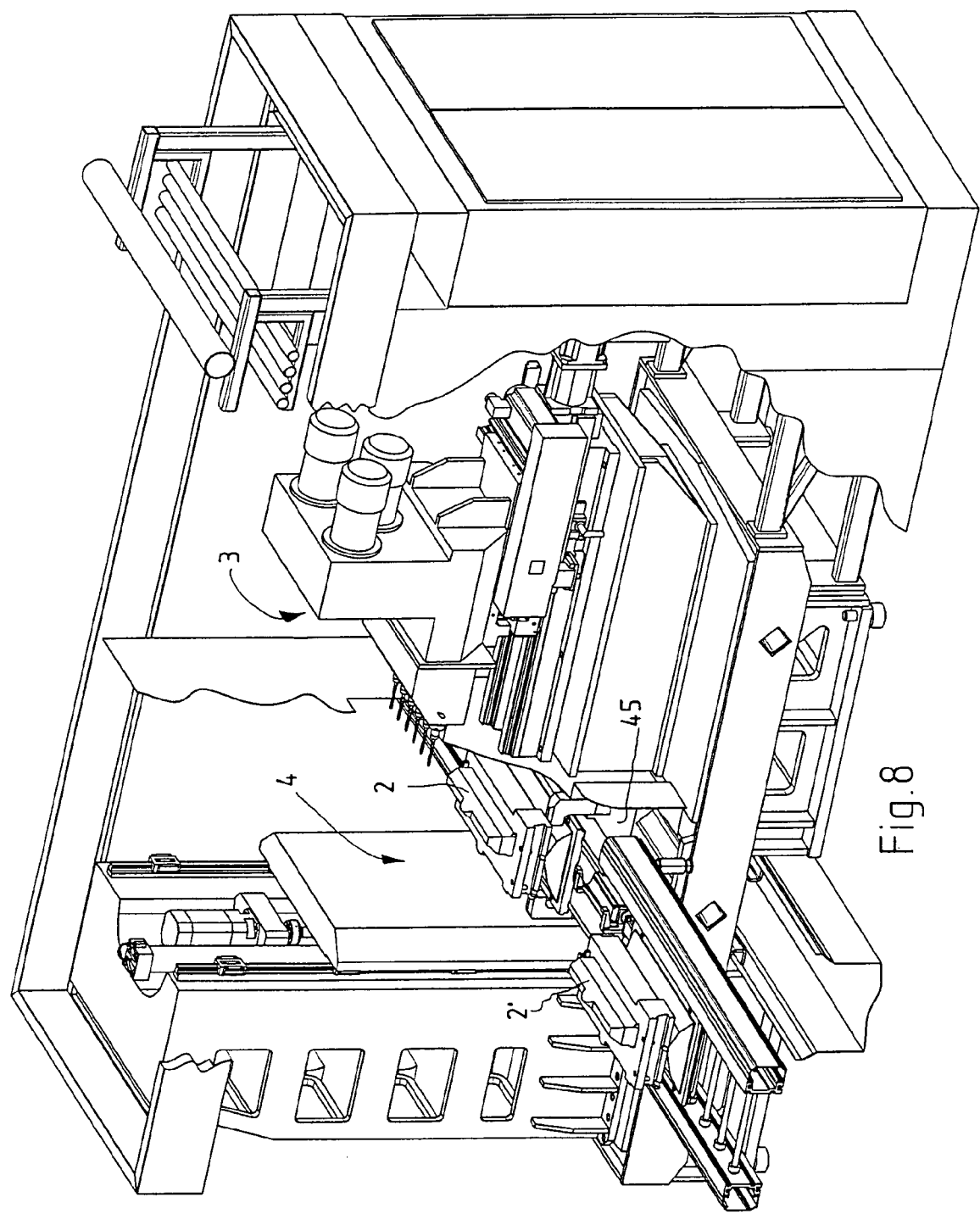
Figure 9:
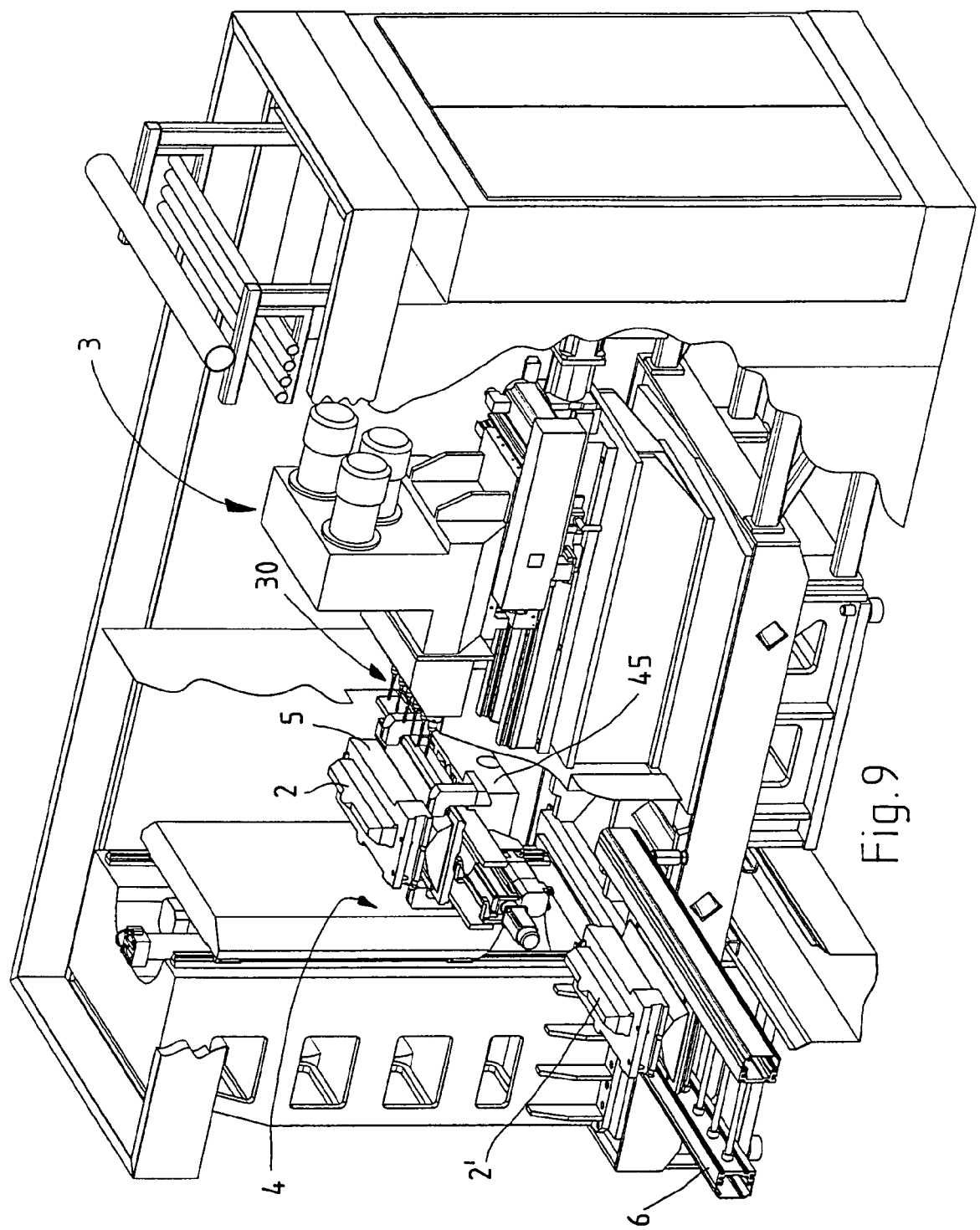

Compared with the embodiment according to FIG. 5, in FIGS. 8, 9 another variant of the invention is shown. According to the suggestion of the invention in FIG. 5 the workpiece carrier 5 is held by cheeks 43 rocker-like, and thus supported turnable.

In the FIGS. 8, 9 a simpler variant is proposed. A workpiece table 45 is suggested which forms the workpiece carriage 4 and thus allows a movement in particular vertically of the workpiece 2 for positioning and during the machining by the machining unit 3. In a similar way to the solution according to FIG. 5 also in this variant according to FIG. 8, respectively 9, the stand is arranged on the side of the conveying line 6 which is opposite the machining unit.

In FIG. 8 the still lowered position of the workpiece carriage 4 with the workpiece table 45 is shown. After the workpiece carrier 5 with the workpiece 2 has been completely inserted (a detail for that is described in particular in FIG. 10), the workpiece 2 is lifted by the workpiece carriage 4, as it is shown in FIG. 9.

The design of the workpiece table 45 has also advantages with regard to space. It is well visible that the upper region above the workpiece 2 is free for all different kinds of machining. The clamping device for fixing the workpiece carrier 5, respectively the workpiece 2, is, in this variant, located below the workpiece 2, respectively in or below the workpiece table 45.

In FIG. 10 is shown that the clamping device 50 realised here is formed on the workpiece table 45 by means of a gripper 500 which can be lifted and lowered, and the upper end 501 of which engages during feeding the workpiece carrier 5 into the discharge point 60 into grooves 58 of the workpiece carrier 5 and the workpiece carrier 5 is clamped on the workpiece carriage 4 by means of a lifting of the gripper 500 against a buttress 502.

In this variant of the invention the workpiece table 45 projects console-like on the workpiece carriage 4 guided on guide rails 15. Instead of the stand construction the table could be, however, also be lifted from below by means of a shear link.

For the lifting and lowering of the gripper 500 an eccentric drive 503 is provided (see FIG. 11). The eccentric drive 503 is arranged here below the workpiece table 45 and moves together with it. It can well be seen that the gripper 500 has, on its front end 501, several L-shaped coupling elements, which engage into the groove 58 on the workpiece carrier 5.

The elements engaging into the nut are provided fork-like for increasing the stability on the gripper 500.

In FIG. 12 another variant of the machining station according to the invention is shown. The workpiece carriage 4 takes up the workpiece 2 upright. The workpiece carriage 4, on the other hand, can be moved vertically upwards along the Y-axis. The workpiece carriage 4 is shaped as circular table and allows a rotation around the axis B, which is also orientated vertically.

The stand of the workpiece carriage 4 is here on the one side of the conveying direction, on the other side the machining unit 3 is arranged.

This comprises, in the example, a machining spindle 7 which has, in this particular embodiment, two spindles 71, 72. They are supported in the spindle box 70 in such a way that they can move over the guide 74 along the Z-axis.

Furthermore the complete machining unit is supported on a guide 73 which can move along the X-axis (rectangular to the Z-, respectively Y-axis), and thus offers two axes for the machining.

Figure 13:
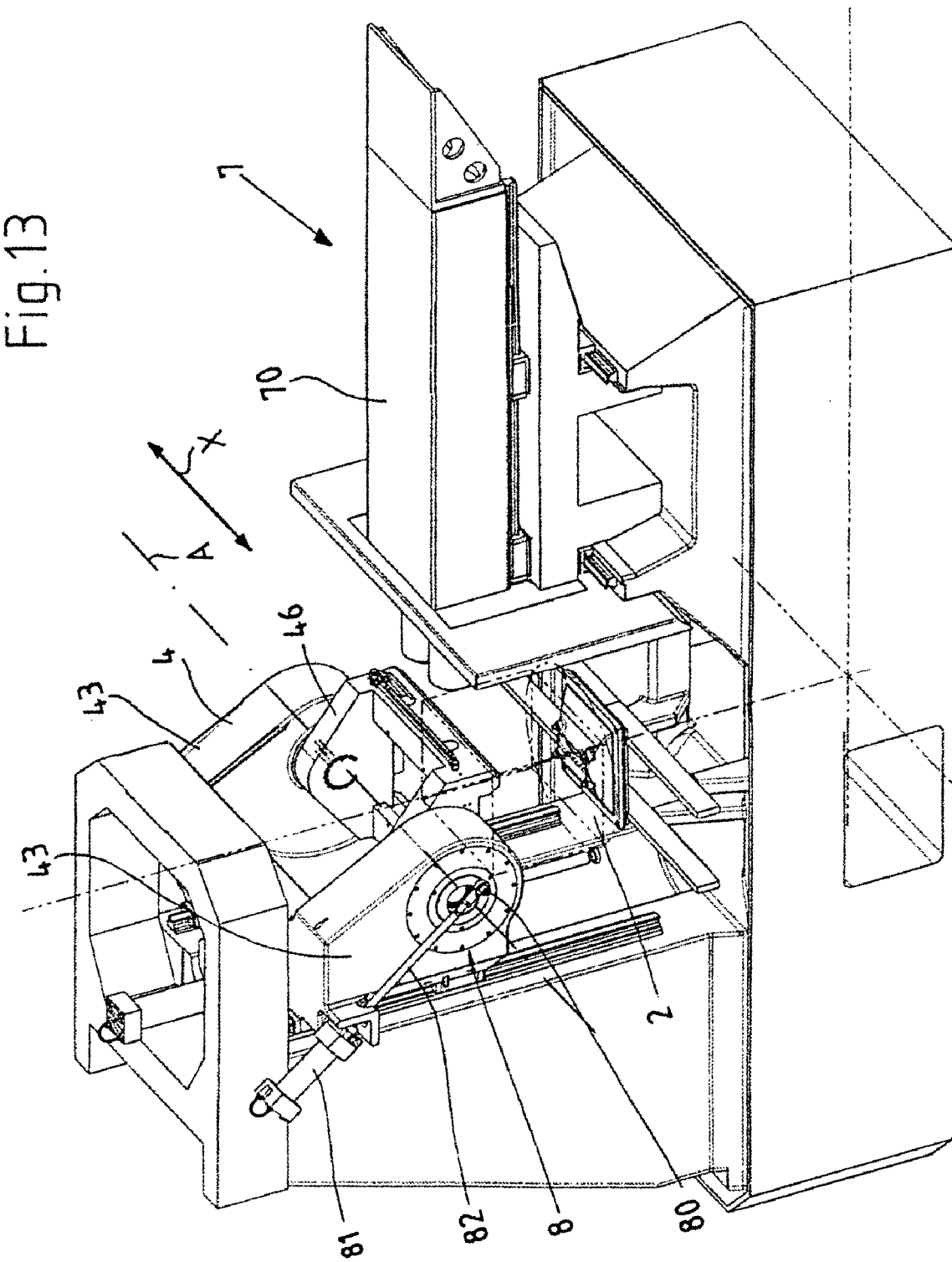

In contrast to the upright mounted orientation of the workpiece 2 shown in FIG. 12, in FIG. 13 a suspended arrangement is realised. The construction of the tool spindle 7 corresponds here with the arrangement according to FIG. 12. Furthermore FIG. 13 shows the counter weight 8. In this example the workpiece carriage 4 is formed by two coherent cheeks 43 which can move laterally vertically and which take up between themselves the carrier 46 which can turn around the A-axis. If now the center of gravity is not positioned on the rotational axis A a turning moment results which has to be buffered accordingly by the adjustment drives. In order to compensate it a counter weight for the swivelling axis is provided. For that purpose the carrier 46 has a crank 80 which is supported eccentric with regard to the rotational axis A, and on which the piston rod 82 of a working cylinder 81 engages rectangular. The working cylinder 81 is now selected in such a way that it acts against the turning moment acting on the piston rod 82 and compensates it. Naturally the working cylinder moves together on the workpiece carriage 4.

By means of the piston area and the length of the crank now there are two variables in order to influence the necessary counter moment. By means of an according adjustment of the length of the crank and the piston area it is possible to connect this weight (or moment) balance to the counter weight known for the linear axes. This makes it possible that only one pressure reservoir (air vessel) is enough for the complete weight, respectively moment, balance of a machining station according to the invention. Additional efforts for monitoring the counter weight is then not necessary in this case as it is already realised anyhow for the counter weight for the linear axes. The invention claims also individual protection, if necessary, for the detail of the counter weight.

The workpiece carriage 4 allows here a turning around the rotational axis A which is parallel to the conveying direction X of the workpiece.

Figure 14:
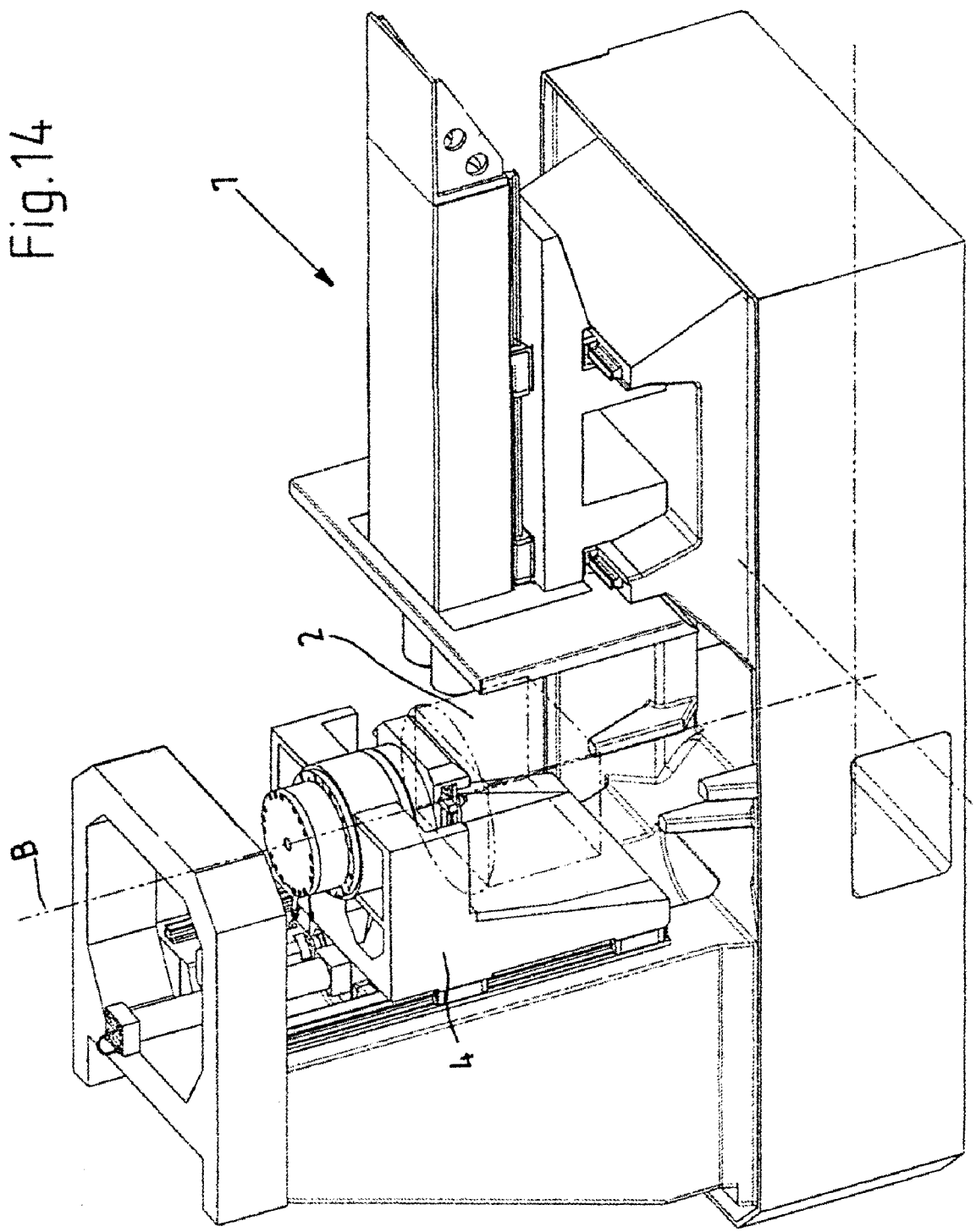

In FIG. 14 another variant according to the invention is shown. The workpiece 2 is taken up on the workpiece carriage 4 in a suspended way. Here the workpiece 2 can be rotated around the vertically orientated rotational axis B. Such an arrangement allows, for example, a dry machining because the chips can fall downward without hindrance.

In FIG. 15 it is indicated how in a suspended machining of the workpiece 2 the rotational axis A as well as the rotational axis B can be realised. The workpiece carriage 4 is shown here in a detail, where the two lateral cheeks 43 take up the hinged bearing 42 for the rotational axis A. Between the two cheeks 43 there the carrier 46 is arranged which naturally can be turned with regard to the cheeks 43. This carrier 46 carries a carousel 47 which allows a rotation of the workpiece 2 around the rotational axis B. It has to be taken into consideration here that, of course, also the rotational axis B rotates around the rotational axis A when the carrier 46 is turned accordingly. It is provided here that the workpiece carriage 4 has two lateral cheeks 43 are provided, which carry the carrier 46 in such a way that it can turn, and the carrier holds the workpiece 2 or the workpiece carrier 5. It is provided here that the workpiece 2 is indirectly or directly connected with the carrier 46. In the example shown here the workpiece 2 is clamped via the workpiece carrier 5 to the carousel 47 and thus held indirectly on the carrier 46.

The embodiment with the help of a carousel 47 allows an additional rotation, besides around the A-axis, of the workpiece also around a B-axis.

The X- and Z-axes are deduced here from the drive of the spindle, making a quintuple machining possible.

In FIG. 16 a side view according to FIG. 15 is shown. The carrier 46 can rotate here around the rotational axis A (here a point because of the view) and follows the dashed movement circle.

On the workpiece carrier 5 a driver 59 for conveying is provided. The conveying device which connects the different machining stations with each other grips the driver in order to convey the released workpiece carrier 5 further. It is clear that this also works with a suspended or upright arrangement of the workpiece 2 or any other arrangement of the workpiece 2 with regard to the workpiece carrier 5.

Figure 17:
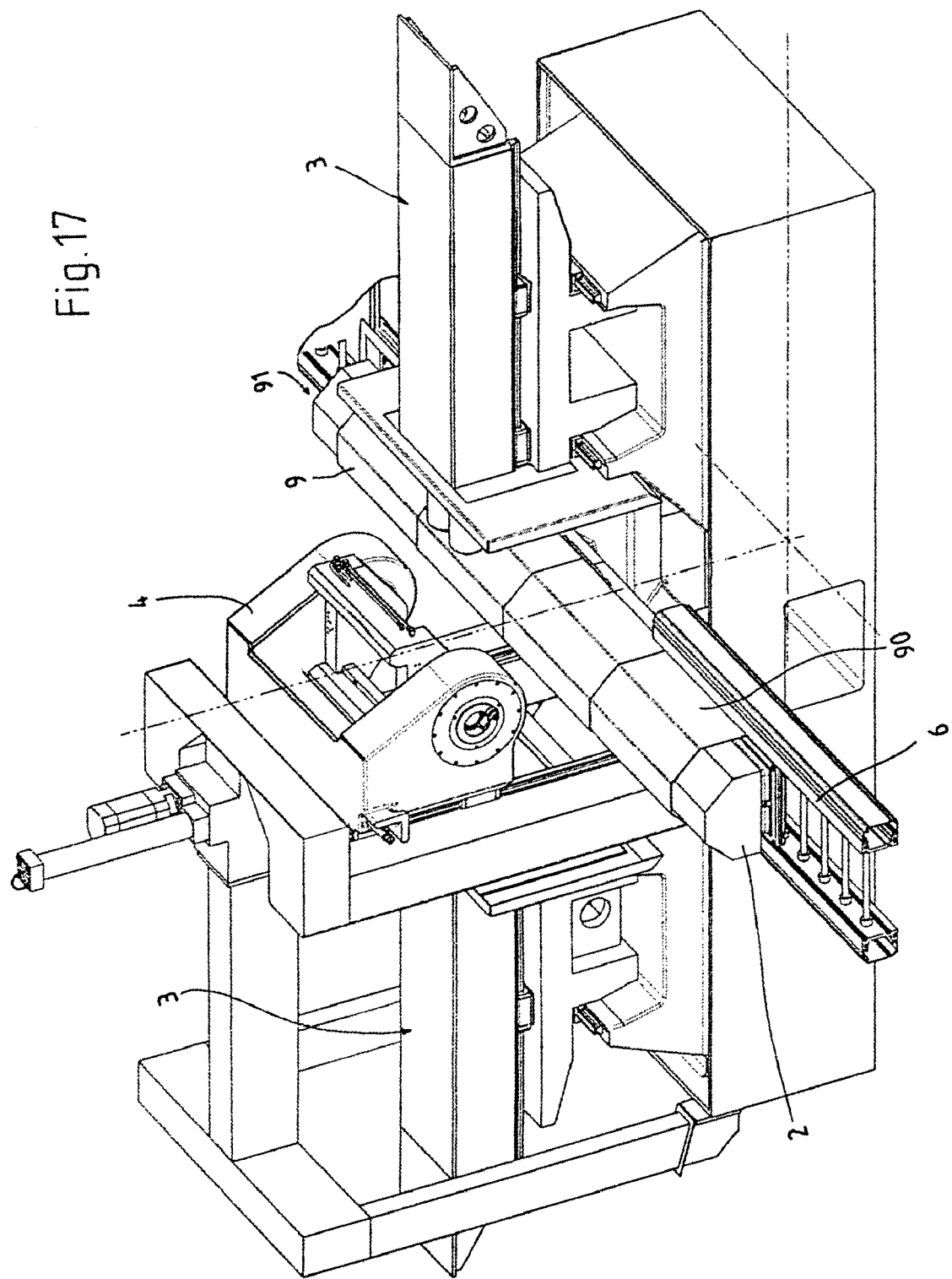

In FIG. 17 another variant of the invention is shown. In order to increase the metal cutting performance a machining unit 3 is arranged on both sides of the conveying line 6. In this case the machining station has several machining units. The machining units 3 themselves have, if necessary, several tool spindles 7. In order to increase the clarity in this example one workpiece 2 is shown. In the case of machining the workpiece 2 is positioned between the two machining units of the machining station and therefore a machining from the front and the back is possible. The parallel arrangement of the respective spindle axes is not decisive here. Important in the sense of the invention is the fact that basically on two or more sides machining units are provided which machine the workpiece.

Figure 18:
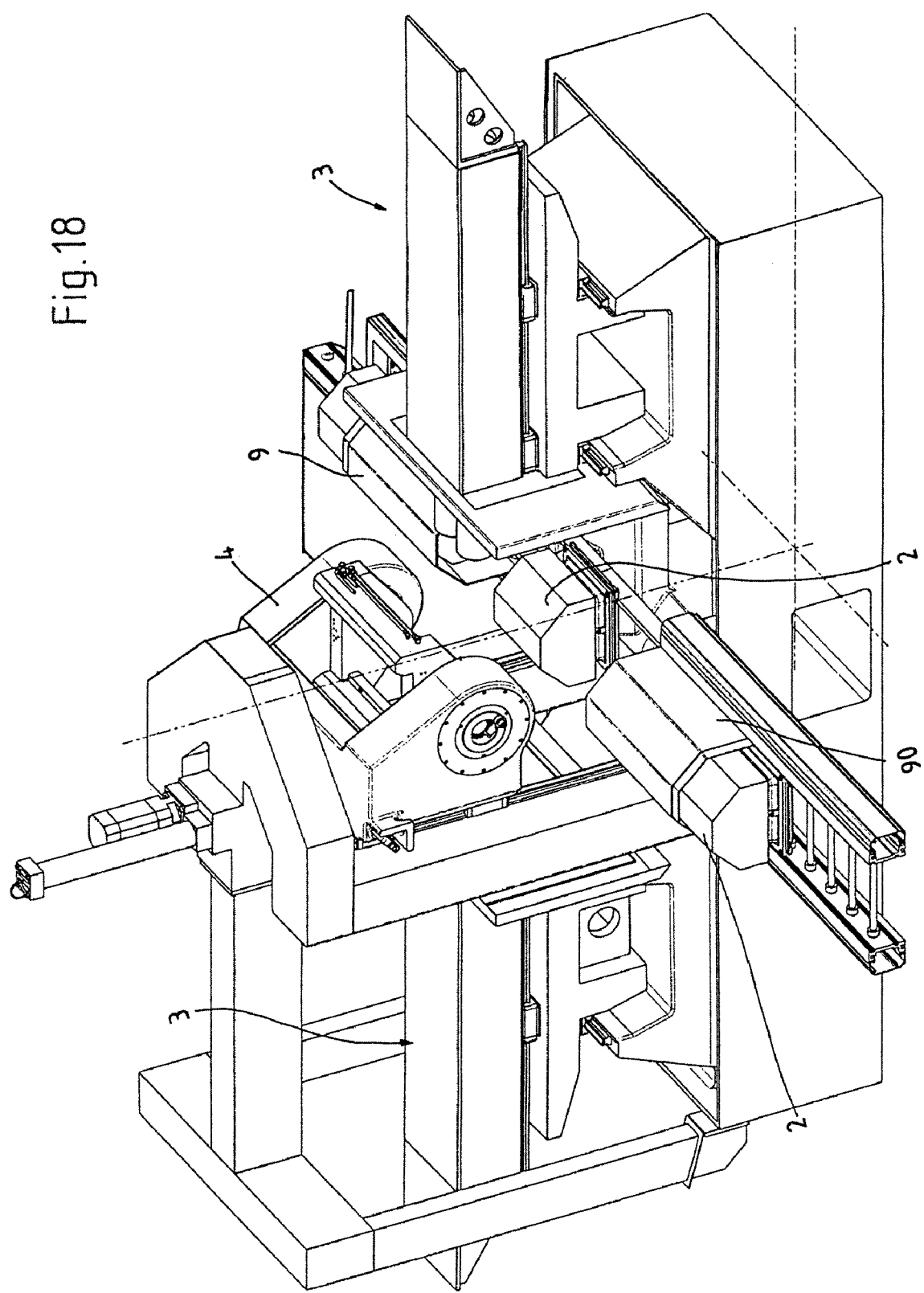

Furthermore FIGS. 17 and 18 show the chip protection 9, as also suggested in a variant according to the invention. It can be recommended to activate the chip protection 9 when, during machining in the machining station, other workpieces 2 have to be conveyed through the machining station in order to reach another machining station which is located farther behind in the direction of flow. The chip protection 9 shown here comprises several coverings 90 which are shaped like a tunnel and can move in X-direction or, if necessary, also guided on the conveying line 6. In FIG. 17 the chip protection is shown closed, therefore a transport tunnel 91 is formed below the workpiece carriage 4 which secures that no chips will fall on the workpieces conveyed through.

In FIG. 18 the opened chip protection 9 is shown. The covering 90 is drawn back in such a way that the workpiece 2 laying in the discharge point is free in such a way that the workpiece carriage 4 can take it up.

Naturally the workpiece carriage can move sufficiently in vertical direction to allow a conveying through of other workpieces 2 without collision. In FIGS. 17, 18 each the suspended devices for taking up the workpieces are provided. The invention is not limited to that, it is possible in the same way to provide an upright (table-like) taking-up of the workpiece by the workpiece carriage 4.

In FIG. 19 another variant of the invention is shown. In contrast to the either horizontally or vertically orientated rotational axes A, B or C, this variant shows a diagonally arranged rotational axis CB. It is orientated here in the quadrant formed by the C and B axes as bisecting line of an angle (tilted at 45° towards the vertical line). Such a design may be an advantage in different machining steps. In this case the workpiece 2 is mounted suspended on the workpiece carriage 4. However, it is also possible to realise an upright design. The complete workpiece carriage 4 (including the rotational axis CB), on the other hand, can move in vertical direction Y.

In FIG. 20 another machining station 1 according to the invention is shown. In this example a tower 100 is suggested which carries a workpiece carriage 4. In the example shown here the workpiece 2 is held suspended on the workpiece carriage 4. This is an advantage, for example, for dry machinings.

The conveying line 6 is designed in this embodiment by means of two roller lines arranged one above the other. Such a design is an advantage in particular in machining installations which use a parallel concept. Here a first part of the conveying line, for example the lower roller conveyor, is used as a feeding line for the raw parts and, in this example, the upper line is used as removal line for the finished workpieces.

For example, via the feeding line 601, which is in the example shown here located below, a workpiece is conveyed into the machining station 1 and there, in the already described manner, taken over on the discharge point by the workpiece carriage 4 and moved to, respectively during, the machining. After the machining has been finished the workpiece 2 is not put again onto the feeding line 601, but conveyed to a removal line 600. In this embodiment it is also shown simultaneously that there may be, if necessary, two separated discharge points for the workpiece.

The concept of the guide of the workpiece carriage 4 on a tower 100 is further improved in FIG. 21. In the example shown here two towers 100, 101 are provided. They are arranged on the left and the right hand side next to the conveying means 62, the conveying means 62 describing a part of the conveying way of the workpiece 2, in particular the conveying way into and from the machining station 1. In the example shown here the conveying means 62 carries out a movement parallel to the spindle axis 31 of the machining spindle 30.

In FIG. 21 it is shown that the two towers 100, 101 are connected via a connection 102. This results in an opening where the workpiece 2 is conveyed in before the machining and conveyed out after the machining. Conveniently here the workpiece 2 is positioned between the two towers 100 and 101 and is taken up there by one or two workpiece carriages 4. Here on each tower 100, 101 a workpiece carriage each is arranged.

This is made in particular clear in the schematic view according to FIG. 22. The view which, comparatively detailed in FIG. 21, is shown in the top view of FIG. 22 only very schematic. The workpiece 2 is positioned either directly or indirectly via a workpiece carrier 5 (pallet) between the two towers 100, 101 and then each is gripped by the two workpiece carriages 4, 4'. The tool spindle 30 can move along the Z- and X-axis, the Y-axis is represented by the workpiece carriage guide on the towers 100, 101.

If necessary, in FIG. 22 the finished workpiece is conveyed back via the same conveying way to the conveying line 6 on which it has been conveyed in. This may be used, for example, for a serial machining.

Figure 23:
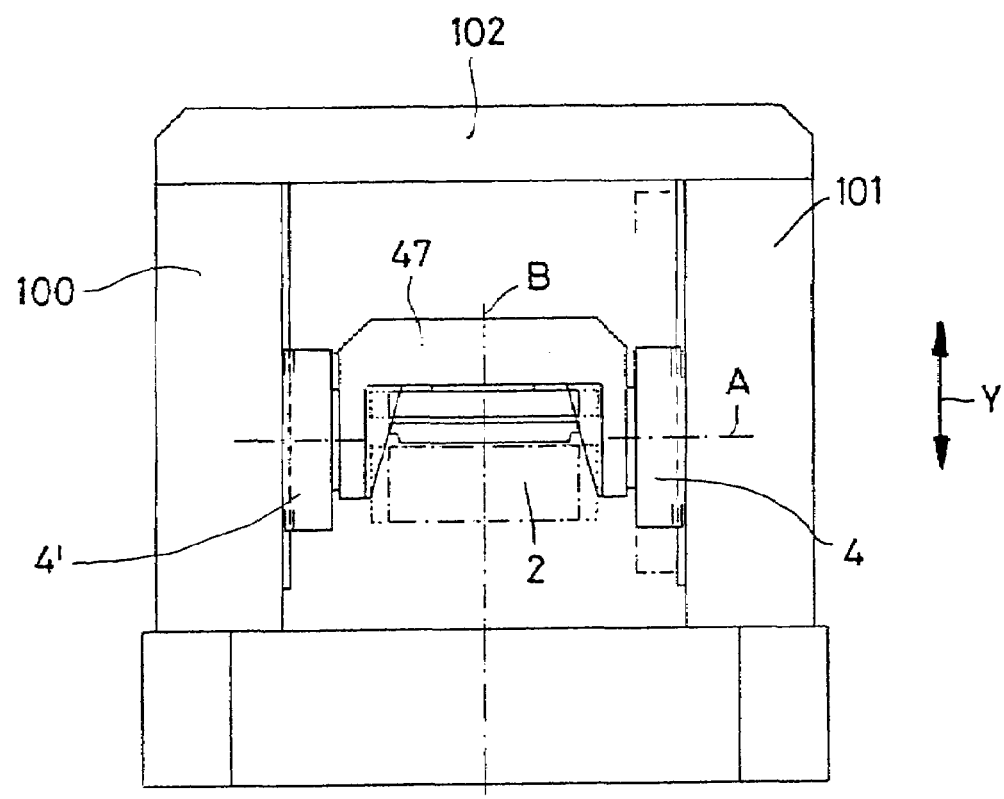

FIG. 23 shows a workpiece 2 which has been picked up suspended. For that purpose the two workpiece carriages 4, 4', which can move on the towers 101, 100 in Y-direction, are connected through a bridge-like carousel 47. This carousel 47 allows a rotation of the workpiece 2 around a rotational axis B which is vertically orientated in this view. In this case this rotational axis B is also parallel to the direction of movement of the workpiece carriages 4, 4'.

In addition to that it is provided that the workpiece 2 can also rotate around a rotational axis A, the rotational axis A being orientated rectangular to the rotational axis B. The rotational axis is, in this case, also rectangular to the direction of movement of the workpiece carriages 4(Y).

As basically an individual drive of the towers 100, 101 is provided for the respective workpiece carriages 4, 4' their synchronising is an advantage in the translator vertical movement as well as in the rotational movement around the rotational axis A. By means of that the forces are distributed equally, however, it is also possible to couple the second workpiece carriage with regard to its translator movement as well as with regard to the rotational movement with the other workpiece carriage. In order to have the common rotational axis A formed for the two workpiece carriages 4, 4' the carousel 47 is supported in such a way that it can rotate on the two workpiece carriages swing- or rocker-like.

In this example a suspended machining is provided, however, also here all other orientations to each other may be used.

Figure 24:
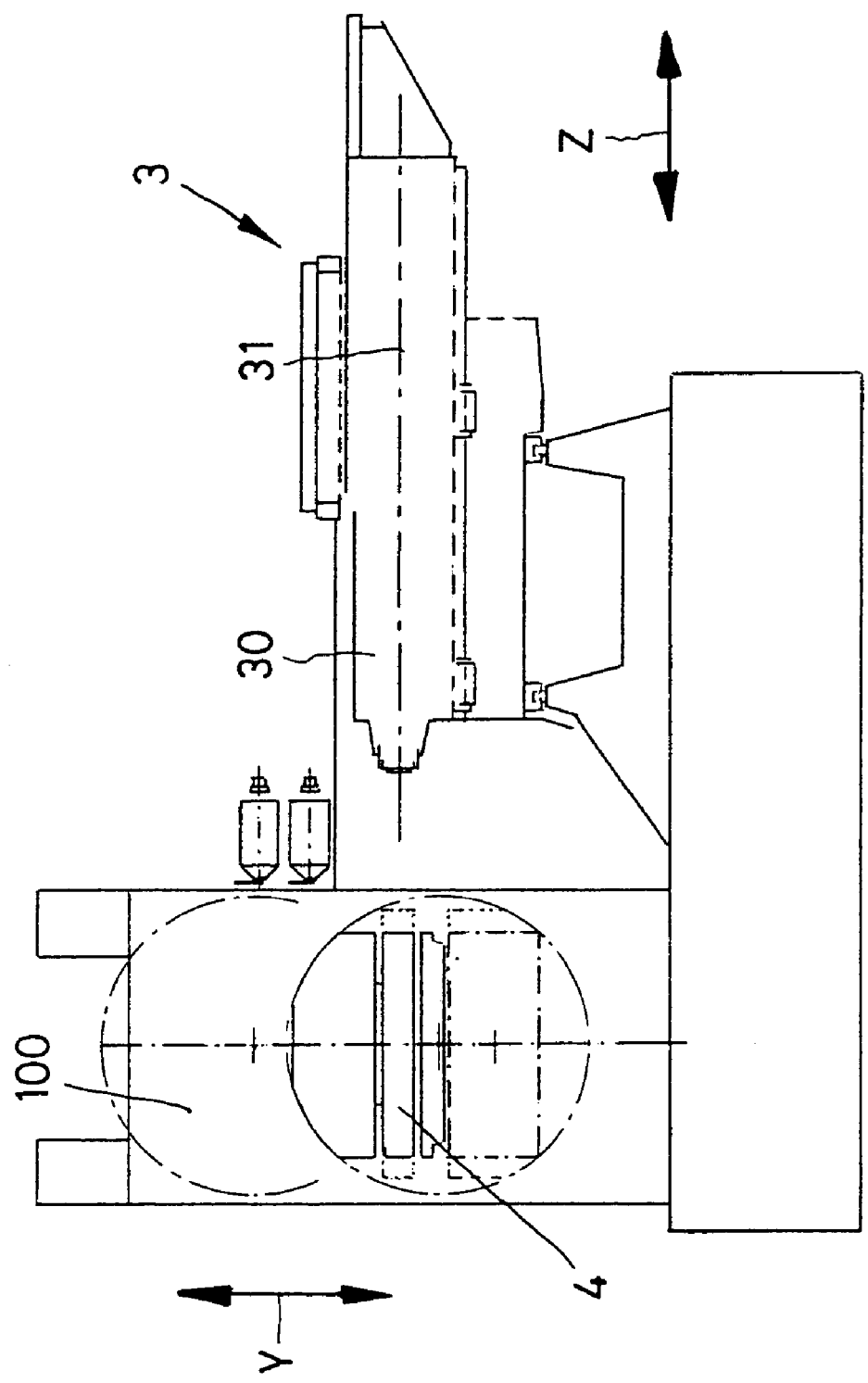

FIG. 24 shows a side view, in particular, of the arrangement according to FIG. 23.

Figure 25:
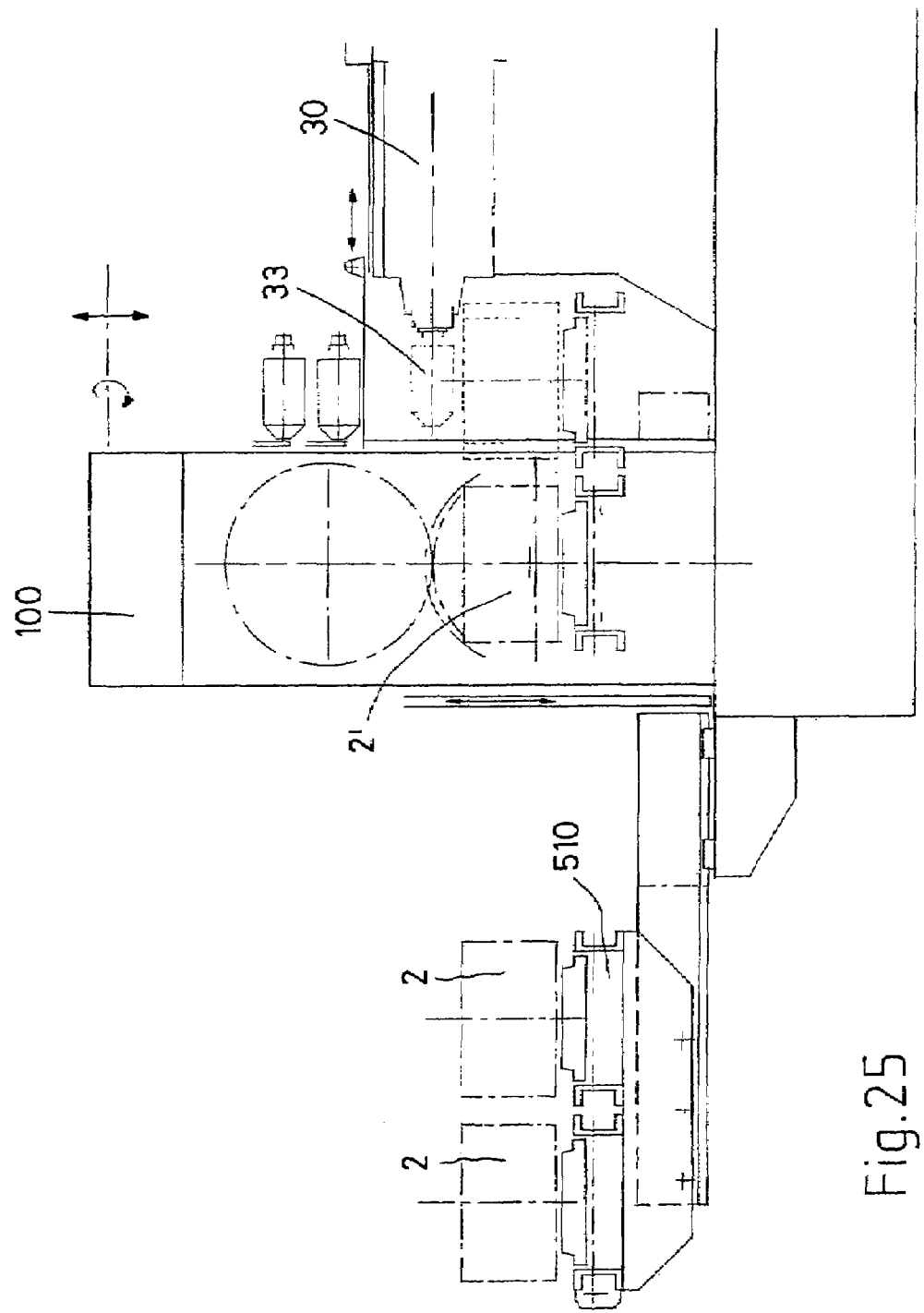

In FIG. 25 it is, compared to the embodiment of FIG. 24, provided that the workpieces 2 are not approached individually, but, as presented here, two workpieces are approached on a common loader 510 to the machining station 1. In the example shown here the workpiece carrier 5, indicated in a dashed line in a further position, is positioned already between the two towers 100, 101, the right hand side workpiece 2 laying below the machining tool 34. This is a changing position of the workpieces 2. The back workpiece 2' is just being given to the loader 510 because it has been finished. The other workpiece 2 which is in this moment still positioned on the right hand side below the machining tool 34 is already positioned very close to the workpiece carriages 4, 4', and can be given over to them in a short time. Therefore the change of tools is carried out very quickly. The conveying of the workpiece to the next machining station is carried out in this case on two belts which are arranged next to each other (in this case not one above each other). The conveying direction of the belts here is vertical to the plane of the paper, these conveying belts are not shown here.

FIG. 26 and FIG. 27 show two very similar application ranges of another variant according to the invention. On the two towers 100, 101 each autonomously moving, but, if necessary, synchronised, workpiece carriages 4, 4' are provided. The machining installation shown here has two clamped on workpieces 2 which have to be machined simultaneously. The machining unit, which has, in this case for example, two Y-axes with one or even two machining spindles each, is arranged covered at the back and cannot be seen in the drawing. The double or quadruple number of spindles, however, increases accordingly the metal cutting performance.

The variant of FIG. 26 according to the invention has only one vertically orientated rotational axis B. The workpiece carriage 4 has a corresponding rotational carousel. Basically, it is also possible in FIG. 26, that the movement of the left hand side and the right hand side workpiece on the respective towers can be carried out independently from each other.

In contrast to that, FIG. 27 shows an additional possibility of a rotation around the horizontally orientated rotational axis A. This may be common for the left hand side and the right hand side workpiece carriage, that means a rotation is for the workpieces 2, 2' only possible together, and also here again it is possible that they rotate independently from each other. In this case the workpiece carriages 4, 4' do not have a stable connection to each other so that they can move independently from each other.

FIG. 28 and FIG. 29 show another variant according to the invention. Compared to FIG. 22, where the conveying direction 69 is parallel to the spindle axis, in FIG. 28 the conveying direction of the workpieces 2 is rectangular to the spindle axes 30. This makes it possible that a two sided machining of the workpiece is carried out, that means the workpiece is located between the two machining spindles 30. In this variant two towers 103, 104 are positioned one behind the other along the conveying way. These tower are, for example, designed identically, they have, in particular, an opening 105 through which, in particular, the workpieces 2 can be conveyed on the conveying way. The towers 103, 104, on the other hand, are supported on both sides of the conveying line 6. The discharge point 60 is located between the two towers 103 and 104. If necessary, these two towers are connected by a connection (not shown). The advantage of this design is the fact that the workpieces 2 can be conveyed further unidirectional. Simultaneously it is possible that the workpieces can be machined on two sides. Of course, also guides 15 are provided on the towers 103, 104, the guides serving for guiding the workpiece carriages 4, 4'. The workpieces are picked up, positioned and, if necessary, also moved during the machining directly or indirectly over the workpiece carrier by both workpiece carriages 4, 4' together or, if necessary, also individually. Here it is also possible again to realise a turning around a rotational axis A and/or, if necessary, around a rotational axis B.

In FIG. 29 it is shown that this variant according to the invention can be realised in a simple way in a common bed 19, if necessary also module-like or module-shaped.

Figure 31:
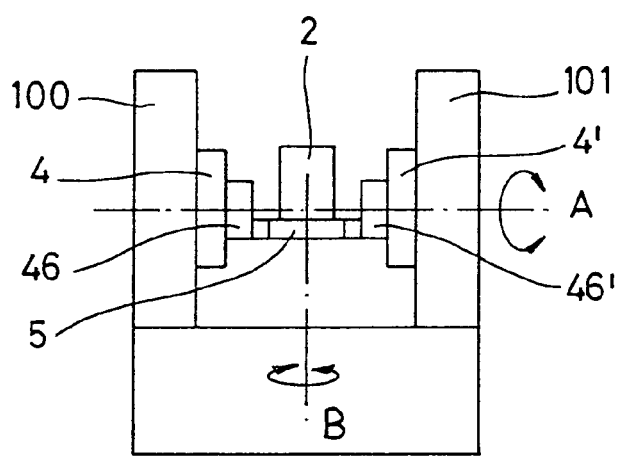
Figure 32:
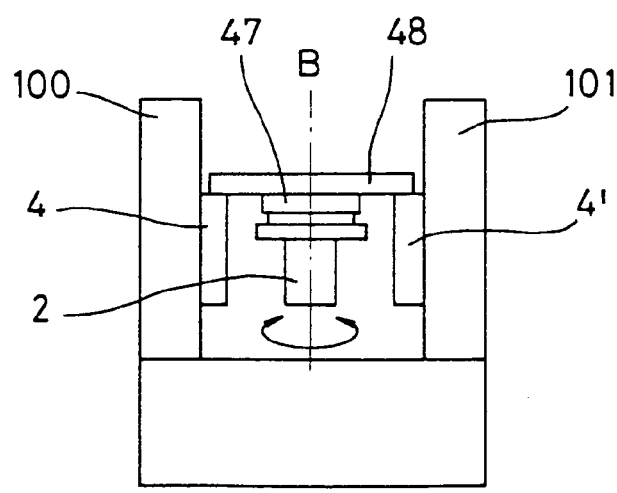

In the FIGS. 30 to 32 different variants of the invention are shown. Here also the workpiece 2 is held by a workpiece carrier 5, the workpiece carrier 5 being clamped and held from the side by the two workpiece carriages 4, 4'. The movement of the workpiece carriages 4, 4' along the towers 100, 101 is synchronous. This variant does not have a rotational axis for the workpiece.

In FIG. 31 additionally a rotational axis A is offered. It is orientated horizontally. For that the workpiece carriages 4, 4' have carriers 46 which allow a turning with regard to the workpiece carriage 4, 4'. Conveniently a horizontal rotational axis A acts simultaneously on several workpieces positioned on workpiece carriage.

In FIG. 32 another variant according to the invention is shown, where the workpiece 2 is, in this case, suspended downwards on the workpiece carrier 5. In this case the workpiece carrier 5 does not serve as connection between the two workpiece carriages 4, 4', but a bridge 48 arranged especially for this purpose. The carousel 47 is arranged on this bridge 48 and thus allows a rotation around a vertical B-axis. Also several B-axes may be provided for a great number of workpieces.

Of course it is possible to find an arrangement where several workpiece carriages 4 are guided on towers 100 and allow a rotation around a horizontal axis A as well as around a vertical axis B.

The arrangement of the carriages 4, 4' according to FIG. 32 together with the connecting bridge 48 can also be combined in one component. Basically it is possible, this goes for all embodiments of the description, to clamp the workpiece 2 also without the use of a workpiece carrier 5 on the workpiece carriage (one or more).

The variants shown in FIG. 30 to FIG. 32 can analogously also be used for the embodiments with only one workpiece carriage.

This description is often based on the fact that the machining unit 3 can be designed actually only as a metal cutting machining unit. However, the invention is not limited to that, naturally any other machinings can be carried out on the workpiece in the sense of the invention. The arrangement according to the invention is, in this respect, independent from the applied machining procedure. These may be also machining lasers or the like. The purpose of the machining station does not limit the invention in no way, either.

Furthermore the invention is also suitable to be used for a parallel machining procedure as well as for a serial machining procedure.

A parallel machining procedure provides that along a machining installation several machining stations are arranged which carry out the same machinings. This means that one workpiece does not necessarily have to pass all machining stations of this machining installation. A parallel concept is an advantage, for example, when machining steps, which need a long time have to be carried out, and it has to be taken into consideration that the slowest machining station determines the overall speed of the complete installation. Also a redundancy of machining stations may be convenient for maintenance or failures. Usually a parallel machining procedure has two conveying belts, namely a first one for raw parts and a second one for the finished parts, however there are concepts (for example FIG. 18) where a parallel concept can be realised with one conveying belt which then passes, for example, through the machining station.

In contrast to that in a serial machining procedure it is provided that a workpiece passes all machining stations along a machining installation in order to receive all necessary machining steps. Typically in such a serial machining procedure one conveying belt may be sufficient for the conveying of the workpieces, because there is no risk to confuse raw parts and finished parts.

An essential advantage of the invention is the fact that the machining station according to the invention can be used for a parallel machining procedure as well as for a serial machining procedure.

Although the invention has been described by exact examples which are illustrated in the most extensive detail, it is pointed out that that this serves only for illustration and that the invention is not necessarily limited to it because alternative embodiments and methods become clear for experts in view of the disclosure. Accordingly changes can be considered which can be made without departing from the contents of the described invention.

The invention claimed is:

1. Machining station for machining of at least one workpiece, said machining station comprising
   at least one machining unit including a tool spindle carrying a tool and the workpiece being conveyed to a discharge point and being picked up at the discharge point by at least one workpiece carriage, the at least one workpiece carriage conveying the workpiece for a machining as well as moving the workpiece through the machining unit during the machining, the workpiece being movable by the workpiece carriage along only one vertical linear Y-axis, the at least one workpiece carriage being guided in a stand or in a tower,
   the tool spindle being movable relative to the at least one workpiece carriage along the Z- and X-axes with respect to a direction of movement of the at least one workpiece carriage along the only one vertical linear Y-axis.

2. Machining station according to claim 1, wherein the discharge point is located within the machining station.

3. Machining station according to claim 1, wherein the workpiece carriage is able to rotate the workpiece around a rotational axis.

4. Machining station according to claim 1, wherein the workpiece carriage carries several workpieces.

5. Machining station according to claim 1, wherein the workpiece carriage moves essentially vertically.

6. Machining station according to claim 1, wherein the workpiece is clamped on a workpiece carrier.

7. Machining station according to claim 1, wherein the workpiece is clamped on a workpiece carrier in an upright, suspended, lateral or inclined orientation.

8. Machining station according to claim 1, wherein the workpiece carriage grasps and holds the workpiece, respectively a workpiece carrier which carries the workpiece, from above, inclined from a side and/or from below.

9. Machining station according to claim 1, wherein the workpiece carriage is a frame or a rocker.

10. Machining station according to claim 1, wherein the workpiece carriage is a table, and the workpiece is supported by a workpiece table of the workpiece carriage.

11. Machining station according to claim 1, wherein the workpiece carriage rotates the workpiece around at least one rotational axis and the rotational axis is rectangular parallel or angular to the vertical direction of movement of the workpiece carriage.

12. Machining station according to claim 1, wherein a hinged bearing is provided on the workpiece carriage.

13. Machining station according to claim 1, wherein several workpieces positioned on the workpiece carriage are rotated around a common horizontal axis.

14. Machining station according to claim 1, wherein the workpiece carriage rotates the workpiece around two or three axes each directed rectangular to each other.

15. Machining station according to claim 1, wherein on the workpiece carriage at least one lateral cheek is provided which rotatably carries a carrier, and the carrier holds the workpiece or a workpiece carrier.

16. Machining station according to claim 1, wherein the workpiece or a workpiece carrier is held by a carrousel which is supported rotatably on a carrier, and the carrier is arranged at the workpiece carriage.

17. Machining station according to claim 1, wherein at least one lateral cheek is provided at the workpiece carriage and the at least one lateral cheek holds a hinged bearing.

18. Machining center according to claim 1, wherein the workpiece or a workpiece carrier is held by a carrousel which is supported rotatably on a carrier and the carrier is arranged on the workpiece carriage and the carrousel can be turned around a a vertical axis.

19. Machining center according to claim 1, wherein for each workpiece carried by the workpiece carriage a single carrousel is provided.

20. Machining station according to claim 1, wherein the workpiece carriage is guided in a frame.

21. Machining station according to claim 1, wherein the workpiece carriage is guided in such a way that a machining from two sides with regard to a conveying line is carried out.

22. Machining station according to claim 1, wherein the workpiece carriage is guided in the stand and the stand for the guide of the workpiece carriage is arranged in a region of the discharge point on a side opposite the machining unit.

23. Machining station according to claim 1, wherein the workpiece carriage is guided in a frame and the frame extends, respectively is supported, in a region of the discharge point on both sides of the discharge point.

24. Machining station according to claim 1, wherein the workpiece carriage is guided in a frame and vertically orientated frame parts have guide rails on which at least one guide shoe of the workpiece carriage moves.

25. Machining station according to claim 1, wherein the workpiece is moved along a conveying line and the discharge point is part of the conveying line.

26. Machining station according to claim 1, wherein a first discharge point for the feeding and a second discharge point, distant from the first one, for the removing of the workpieces is provided.

27. Machining station according to claim 1, wherein the machining unit has conveying means for movement of the workpiece on a conveying line.

28. Machining station according to claim 1, wherein the machining unit has conveying means for movement of the workpiece on a conveying line and the conveying means feeds a workpiece, waiting in front of the machining station on the conveying line into the machining station.

29. Machining station according to claim 1, wherein the machining unit has conveying means for the movement of the workpiece on the conveying line and the conveying means conveys finished workpieces to the conveying line positioned in a flow direction behind the machining station.

30. Machining station according to claim 1, wherein the machining unit is moved and positioned rectangularly to movement of the workpiece carriage.

31. Machining station according to claim 1, wherein the machining unit carries one or more tool spindles.

32. Machining station according to claim 1, further comprising several machining units.

33. Machining station according to claim 1, wherein the workpiece is positioned between two machining units during the machining.

34. Machining station according to claim 1, wherein the workpiece carriage is able to turn the workpiece around at least one rotational axis and the rotational axis is, on one hand, rectangular to a spindle axis and, on the other hand, is rectangular to the direction of movement of the workpiece carriage.

35. Machining station according to claim 1, further comprising a tool magazine for the machining unit.

36. Machining station according to claim 1, wherein independently from the movement of the workpiece carriage also a tool magazine is moved and positioned.

37. Machining station according to claim 1, wherein a clamping device is provided in order to connect the workpiece carrier carrying the workpiece with the workpiece carriage.

38. Machining station according to claim 1, wherein relative motion of the workpiece carriage serves for grasping, respectively releasing, the workpiece.

39. Machining unit according to claim 1, wherein a clamping device on the workpiece carriage is formed by a gripper which is lifted and lowered, and for lifting and lowering the gripper an eccentric drive is provided which moves together with the workpiece carriage.

40. Machining unit according to claim 1, wherein on the workpiece carriage a hinged bearing is provided around a rotational axis and a counterweight is provided on the hinged bearing.

41. Machining station according to claim 1, wherein on the workpiece carriage a hinged bearing is provided, and a counterweight is provided on the hinged bearing and the counterweight is formed by a working cylinder which acts on a crank of a carrier.

42. Machining station according to claim 1, further comprising two towers for movement of the workpiece, and each tower carries a movable workpiece carriage and the moveable workpiece carriages engage and vertically carry at least one workpiece.

43. Machining station according to claim 1, further comprising two towers for movement of the workpiece, and each tower carries a movable workpiece carriage and the moveable workpiece carriages engage and vertically carry at least one workpiece and one tower each arranged on one side each of a conveying way.

44. Machining station according to claim 1, further comprising two towers for movement of the workpiece, the towers are arranged one behind the other in direction of conveying of the workpieces and each tower is supported on both sides of a conveying line, each tower having an opening for the conveying line.

45. Machining station according to claim 1, further comprising two towers for movement of the workpiece, each tower carries a movable workpiece carriage and the workpiece carriages carry at least one workpiece and the discharge point is located between the towers.

46. Machining station according to claim 1, wherein the machining unit has conveying means for movement of the workpiece on a conveying line and further comprising two towers for movement of the workpiece, and each tower carries a movable workpiece carriage and the moveable workpiece carriages engage and vertically carry at least one workpiece, and the conveying means is located between the towers.

47. Machining station according to claim 1, further comprising two towers for movement of the workpiece, each tower carries a movable workpiece carriage and the workpiece carriages carry at least one workpiece and the tool spindle is arranged between the towers.

48. Machining station according to claim 1, further comprising two towers for movement of the workpiece, each tower carries a movable workpiece carriage and the workpiece carriages carry at least one workpiece and a workpiece or a workpiece carrier carrying the workpiece is moved by at least one workpiece carriage of the two towers.

49. Machining station according to claim 1, further comprising two towers for movement of the workpiece, and each tower carries a movable workpiece carriage and the moveable workpiece carriages engage and vertically carry at least one workpiece and the towers are connected in an upper region.

50. Machining station according to claim 1, further comprising two towers for movement of the workpiece, each tower carries a movable workpiece carriage and the towers carry at least one workpiece and each tower has a drive for the workpiece carriage.

51. Machining station according to claim 1, further comprising two towers for movement of the workpiece, each tower carries a movable workpiece carriage and the workpiece carriages carry at least one workpiece and each tower has a drive for the workpiece carriage and the workpiece carriage drives of the two towers are synchronised to each other.

52. Machining station according to claim 1, further comprising two towers for movement of the workpiece, each tower carries a movable workpiece carriage and the workpiece carriages carry at least one workpiece and the workpiece carriages of both towers have a common rotational axis.

53. Machining station according to claim 1, further comprising two towers for the movement of the workpiece, each tower carries a movable workpiece carriage and the workpiece carriages carry at least one workpiece and the workpiece carriages each have a rotating drive for a common rotational axis and the rotational drives are synchronised to each other.

54. Machining station according to claim 1, wherein the workpiece carriage for the workpiece has a rotational drive for a rotational axis which is orientated parallel to the direction of movement of the workpiece carriage.

55. Machining station according to claim 1, further comprising two towers for movement of the workpiece, each tower carries a movable workpiece carriage and the workpiece carriages carry at least one workpiece and the workpiece carriages of both towers are connected by a bridge, the bridge is able to rotate the at least one workpiece around at least one rotational axis parallel to the direction of movement of the workpiece carriages.

56. Machining station according to claim 1, wherein the machining unit has conveying means for movement of the workpiece on a conveying line and the conveying means carries out feeding as well as removing of workpieces.

57. Machining station according to claim 1, wherein the machining unit has conveying means for movement of the workpiece on a conveying line and the conveying means has a means for feeding and removing, unfinished workpieces are fed on the means of feeding and machined workpieces are conveyed away on the means for removing.

58. Machining station according to claim 1, wherein the machining unit has conveying means for movement of the workpiece on a conveying line and the conveying means has a means for feeding and removing, unfinished workpieces are fed on the means for feeding and machined workpieces are conveyed away on the means for removing and the means for feeding and means for removing are arranged one above the other or next to each other.

59. Machining station according to claim 1, wherein two or more workpieces are clamped on a workpiece carrier.

60. Machining station according to claim 1, wherein the workpieces are arranged on a workpiece carrier in a longitudinal direction of a way of conveying.

61. Machining station according to claim 1, further comprising two or more tool spindles for machining simultaneously two or more workpieces.

62. Machining station according to claim 1, wherein several workpieces are moved by one or more workpiece carriages in a same way or at least partly differently.

63. Machining station according to claim 1, wherein the spindle axis of the tool spindle is orientated parallel or rectangular to a direction of transport of the workpiece.

64. Machining installation comprising at least one or more machining stations according to claim 1, wherein all of the machining stations are provided with a conveying line for feeding and removing the workpiece.

65. Machining installation according to claim 64, wherein two or more machining stations are provided one behind the other and fed workpieces are conveyed through a first machining station to a free machining station.

66. Machining installation according to claim 64, wherein each workpiece carries an identification element which also can be written on.

67. Machining installation according to claim 64, wherein the machining stations are arranged one behind the other and the line for removing of the first machining station is the feeding line for the second machining station.

68. Machining installation according to claim 64, wherein several machining stations are arranged between a feeding line and a line for removing which are common for the machining station.

69. Machining installation according to claim 64, wherein the machining stations are arranged one behind the other and the removing line of the first machining station is the feeding line for the second machining station and there is a connecting station from the removing line to the feeding line, and already machined workpieces are again fed for machining on the feeding line.

70. Machining installation according to claim 64, wherein the machining stations are arranged parallel and/or serial to each other and are connected by a conveying line.

71. Machining installation according to claim 64, wherein for conveying the workpieces at least two conveying lines are provided which are arranged essentially parallel to each other, next to each other or one above the other.

* * * * *